(12) United States Patent
Freedman et al.

(10) Patent No.: US 8,427,369 B1
(45) Date of Patent: Apr. 23, 2013

(54) AMPLITUDE CALIBRATION ESTIMATION

(75) Inventors: Jeffrey Freedman, Laurel, MD (US); Erik Halvorson, Foster City, CA (US); Scott Markley, Washington, DC (US)

(73) Assignee: RKF Engineering Solutions, LLC, Washington, DC (US)

( * ) Notice: Subject to any disclaimer, the term of this patent is extended or adjusted under 35 U.S.C. 154(b) by 231 days.

(21) Appl. No.: 13/053,174

(22) Filed: Mar. 21, 2011

Related U.S. Application Data

(60) Provisional application No. 61/315,711, filed on Mar. 19, 2010.

(51) Int. Cl.
*H04B 7/185* (2006.01)

(52) U.S. Cl.
USPC ........................................................ 342/358

(58) Field of Classification Search .................... 342/358
See application file for complete search history.

(56) References Cited

U.S. PATENT DOCUMENTS

2010/0177678 A1    7/2010   Sayegh

*Primary Examiner* — Harry Liu
(74) *Attorney, Agent, or Firm* — Fish & Richardson P.C.

(57) ABSTRACT

In one implementation, a first measurement of gain of a first calibration signal retransmitted from a first satellite element and a second measurement of gain of a second calibration signal retransmitted from a second satellite element may be obtained. A first expected gain for the first element and a second expected gain for the second element may be accessed. A weight indicative of a confidence in the first measurement may be computed using a gradient of a geodetic radiation pattern of the first element. A weight indicative of a confidence in the second measurement also may be computed using a gradient of a radiation pattern of the second element. A cost function may be generated and values for one or more unknown variables may be computed by reducing the cost function with respect to the one or more unknown variables. The computed values for the unknown variables may be stored.

32 Claims, 7 Drawing Sheets

AMPLITUDE CALIBRATION ESTIMATION

CROSS-REFERENCE TO RELATED APPLICATIONS

This application claims priority to U.S. Provisional Application No. 61/315,711 filed on Mar. 19, 2010 and titled "MINIMUM MEAN SQUARE ERROR POINTING ESTIMATION," which is incorporated herein by reference in its entirety.

TECHNICAL FIELD

The following disclosure relates generally to amplitude calibration estimation for a ground based beam forming satellite communications system.

BACKGROUND

Some satellite communications systems provide multiple beams that connect a multitude of users to a gateway. The multiple beams may be generated using a ground based beam forming (GBBF) system. A GBBF system may require amplitude calibration and/or phase calibration to account for variations in amplitude and/or phase on the communications links between the satellite and the users.

DETAILED DESCRIPTION

Figure 1:
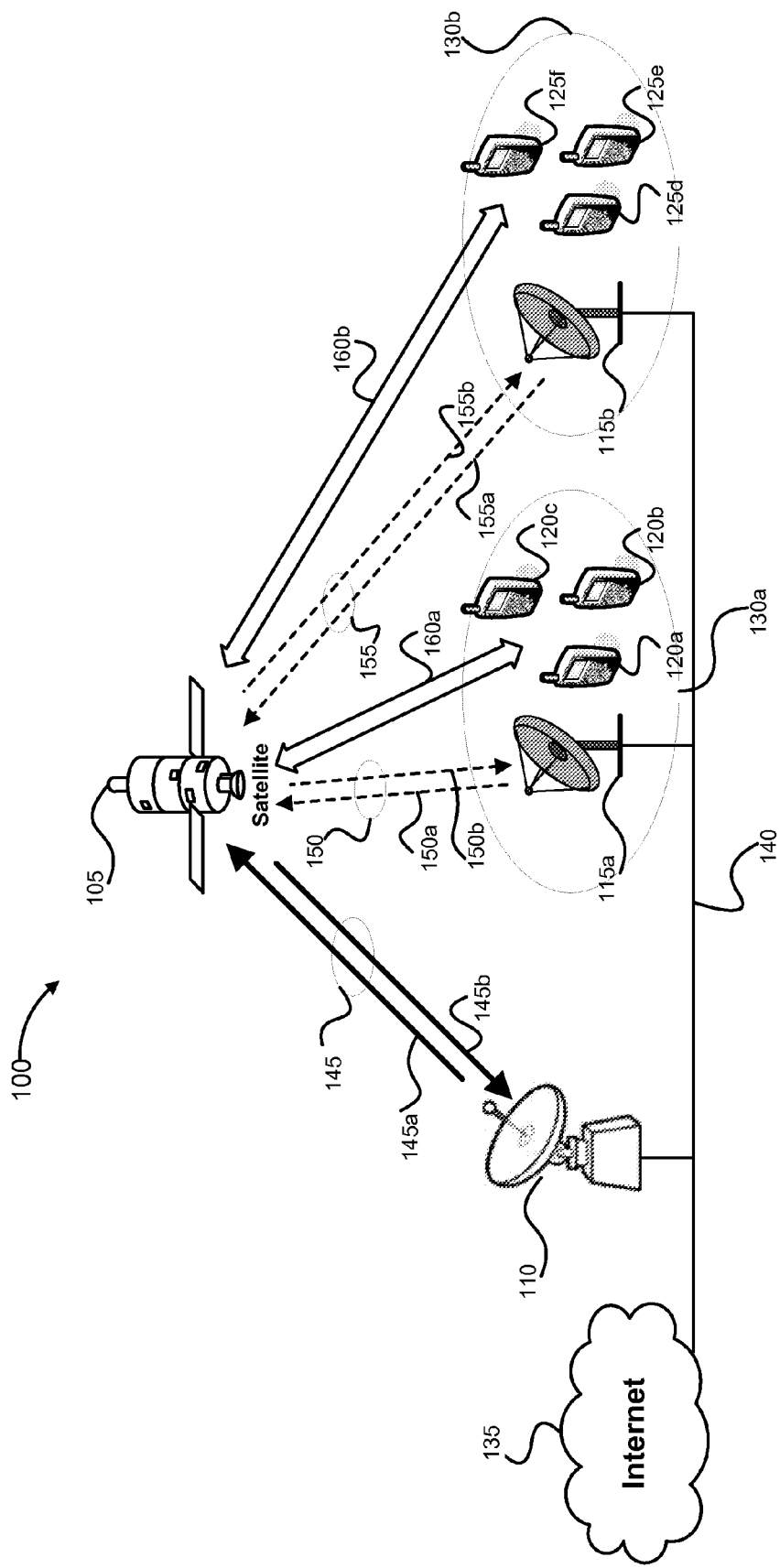
FIG. 1 illustrates an example of a GBBF satellite communications system that enables amplitude calibration, phase calibration and/or satellite pointing correction.

In the context of a satellite communications system, a satellite may use multiple elements, in, for example, a phased array or as part of a reflector antenna, to form one or more communication beams for communicating with terrestrial devices. An element refers to either a physical or a logical radiating structure on the satellite that is capable of emitting and/or receiving energy. A satellite communications system may use combinations of elements on the satellite to generate multiple beams. Beam forming is implemented by adjusting the amplitude and phase of each signal path routed to each element. Each individual signal path is routed to multiple elements with relative amplitudes and phases that are precisely set to define each intended beam. The beam forming may be accomplished by constructing a fixed beam forming network behind the element array using processors on board the satellite; this process is typically called Space-Based Beam Forming. However, performing beam forming on the satellite may increase the weight, power demands, and cost of the satellite payload. Moreover, a satellite communications system that employs onboard beam forming also may be less flexible in reacting to changing demands or improved technologies. Systems that perform beam forming off satellite, e.g., systems that perform Ground Based Beam Forming (GBBF) or hybrid systems, therefore, may provide the same or greater flexibility than beam forming onboard the satellite while eliminating or reducing the costs associated with onboard beam forming hardware.

GBBF, however, may require knowledge of the amplitude and/or phase changes of the signals caused by the return and forward paths in a satellite communications system. The amplitude and/or phase of a signal also may be affected by various satellite components, for example amplifiers and onboard processors. Therefore, GBBF systems may require methods that determine the amplitude and/or phase effects of the forward and return paths such that the system may compensate for these effects during beam forming. The compensation of the amplitude and/or phase effects of the forward and return paths may be achieved, for example, through amplitude and phase calibration and through satellite pointing correction.

For amplitude calibration (also referred to interchangeably as gain calibration), the relative gain of each satellite element may be chosen to minimize a cost function through use of a minimum mean square error (MMSE) algorithm. In this context, the relative gain of a satellite element may be a value that indicates the gain of satellite element relative to a gain of a reference satellite element, where the reference satellite element may be a pre-determined satellite element in the satellite communications system or a known reference value. The calibration may be done at the gateway and may be done separately for the forward direction, i.e., for the direction from the satellite to the user terminals on the ground, and for the return direction, i.e., from the user terminals to the satellite. Notably, the elements on the satellite that are used for transmission on the forward path (i.e., the forward link elements) may be different from the elements on the satellite that are used for receiving signals on the return path (i.e., the return link elements). In addition or as an alternative to the relative gain of a satellite element, the relative gain of a calibration earth station (CES) also may be chosen to minimize a cost function through use of a minimum mean square error (MMSE) algorithm. The relative gain of a CES may be a value that indicates the gain of the CES relative to a gain of a reference calibration station, where the reference satellite element may be a pre-determined CES in the satellite communications system or a known reference value.

For amplitude calibration of the return path (also referred to interchangeably as return link or return channel or uplink), the gateway collects measurements of gain for the return link elements by measuring the gain of signals that are received by the gateway from one or more CESs via the return link elements of the satellite. That is, the return link elements of the satellite may receive the signals from the CESs and retransmit the signals down to the gateway for measurement. Using the measurements of gain collected for the return link elements in combination with other parameters, such as, for example, parameters derived from the radiation patterns of the return link elements and the signal to noise ratios (SNRs) of the return path, a cost function may be generated that can be minimized or reduced to determine calibration values for the return link elements.

For amplitude calibration of the forward path (also referred to interchangeably as forward link or forward channel or downlink), the gateway transmits signals to the CESs via the forward link elements of the satellite. That is, the forward link elements of the satellite may receive the signals from the gateway and retransmit the signals to the CESs. The CESs measure the gain of the received signals, and communicate the corresponding gain measurements to the gateway through an alternate back-end communication link, such as, for example, a terrestrial link. Using the measurements of gain collected for the forward link elements in combination with other parameters, such as, for example, parameters derived from the radiation patterns of the forward link elements and the signal to noise ratios (SNRs) of the forward path, a cost function may be generated that can be minimized or reduced to determine calibration values for the forward link elements.

FIG. 1 illustrates an example of a GBBF satellite communications system 100 that enables amplitude calibration, phase calibration and/or satellite pointing correction. The satellite communications system 100 includes a satellite 105 connected through satellite channels to a gateway 110 and to CESs 115a and 115b. The satellite 105 transmits data to and receives data from one or more user terminals 120a, 120b, 120c, 120d, 120e and 120f. User terminals 120a, 120b and 120c are within formed beam coverage area 130a and user terminals 120d, 120e and 120f are within formed beam coverage area 130b. That is, user terminals 120a-120c are located within the geographic extent covered by beam 130a, and user terminals 120d-120f are located within the geographic extent covered by beam 130b. The gateway is connected to the Internet 135 through a communications link 140. CESs 115a and 115b are also connected to the gateway through the communications link 140.

The satellite 105 may be located at a geostationary orbital location defined by a longitude. Alternatively the satellite 105 may be located at a different orbital location, for example, a medium earth orbit. While only a single satellite 105 is shown, a plurality of satellites may be used. The satellite 105 connects the gateway 110 to the two CESs 115a and 115b through satellite communications channels. The satellite 105 also links the user terminals 120a-120f to the gateway 110 through the satellite communications channels. While only a single gateway 110 is shown, a plurality of gateways may be employed. Similarly, more than two CESs may be employed, and any number of user terminals may be used. The satellite 105 may be a bent-pipe satellite that retransmits a received signal, or alternatively, may perform switching of the signals among the formed beams. The satellite 105 may include antennas or phased arrays to enable transmission of information in both directions from the satellite 105 to the gateways, CESs or user terminals. That is, the satellite 105 may include multiple antenna elements. The elements transmit signals to or receive signals from the gateway 110, CESs 115a or 115b and the user terminals 120a-120f.

A subset of the elements in the satellite may be used for transmission in the forward direction from the satellite 105 to the CESs 115a, 115b and the user terminals 120a-120f. These elements are referred to as the forward link elements. The remaining elements may be used for transmission in the return direction from the CESs 115a, 115b and the user terminals 120a-120f to the satellite 105. These elements are referred to as the return link elements. Each forward link element or return link element may be assigned its own unique channel (consisting of frequency and/or polarization) for communicating with the gateway. The channel assigned to an element may not be shared with any other element. Each element also may have its own distinct radiation pattern that may be different from the radiation pattern associated with any other element.

The gateway 110 communicates with the satellite over a feeder link 145, which has both a forward link 145a and a return link 145b. The feeder link 145 may operate, for example, in the Ku-band or the Ka-band. The gateway 110 is coupled to the Internet 135 through a communications link 140. In an alternative implementation, the network 135 may be a non-public data network, a public data network or a combination of public and non-public data networks that is different from the Internet. The communications channel 140 may be a high-speed terrestrial connection, such as, for example, an optical connection with data rates in the range of gigabits per second. In an alternative implementation, the communications channel 140 also may be a satellite communications channel through a satellite that is different from the satellite 105.

The gateway 110 may contain one or more modules that process signals received from the CESs and/or from the satellite elements for GBBF. The one or more modules may be implemented in hardware and/or software. An implementation example of the gateway 110 and its modules is described below with respect to FIG. 2.

The CESs 115a and 115b may provide support for a GBBF subsystem at the gateway 110. The CESs 115a and 115b are connected to the satellite 105 using service links 150 and 155, respectively. The CESs 115a and 115b may receive signals from the gateway 110 over the satellite forward links 150a and 155a, respectively, and may measure the gain and/or phase of the received signals for calibration. The gain and/or phase measurement data for the received signals may be communicated to the gateway 110 over the communications link 140. The measurement data may be used to enable calibration and/or pointing correction for forward GBBF via the satellite 105. The communications link 140 that connects the CESs 115a and 115b to the gateway 110 may be part of a closed network accessible only to components of the satellite communications system 100, or may be part of an open network that connects the gateway 110 to the Internet 135.

The CESs 115a and 115b may transmit signals to the gateway 110 over the satellite return links 150b and 155b, respectively. The gain and/or phase of the return link signals may be measured by the gateway 110 and the corresponding measurement data may be used to enable calibration and/or pointing correction for reverse GBBF via the satellite 105. The service links 150 and 155 may operate, for example, in the L-band or the S-Band. Signals received at the satellite 105 from the CESs 115a and 115b in the L-band or S-Band may, for example, be retransmitted to the gateway 110 in the Ku-Band using the feeder link 145b.

CESs 115a and 115b may be placed strategically in areas of satellite coverage. For example, CES 115a may be positioned within the beam coverage area 130a and CES 115b may be positioned within the beam coverage area 130b. Each of the beam coverage areas 130a and 130b may be serviced by a plurality of CESs that are positioned throughout the geography such that they have an unobstructed view of the satellite 105.

The user terminals 120a-120f are computing devices able to communicate data to and from the satellite 105 over a satellite link. The user terminals 120a-120f may, for example, be handheld mobile telephones or car phones, laptop personal computers, desktop personal computers, and/or geographically fixed phone booths. The user terminals may be in separate satellite coverage areas serviced by different formed beams. For example, user terminals 120a, 120b and 120c may be in beam coverage area 130a, while user terminals 120d, 120e and 120f may be in beam coverage area 130b. The user terminals 120a, 120b and 120c, and 120d, 120e and 120f communicate with each other and with the gateway 110 over the satellite 105 via the satellite links 160a and 160b respectively. The satellite links 160a and 160b each comprise both an uplink to the satellite 105 and a downlink from the satellite 105.

Figure 2:
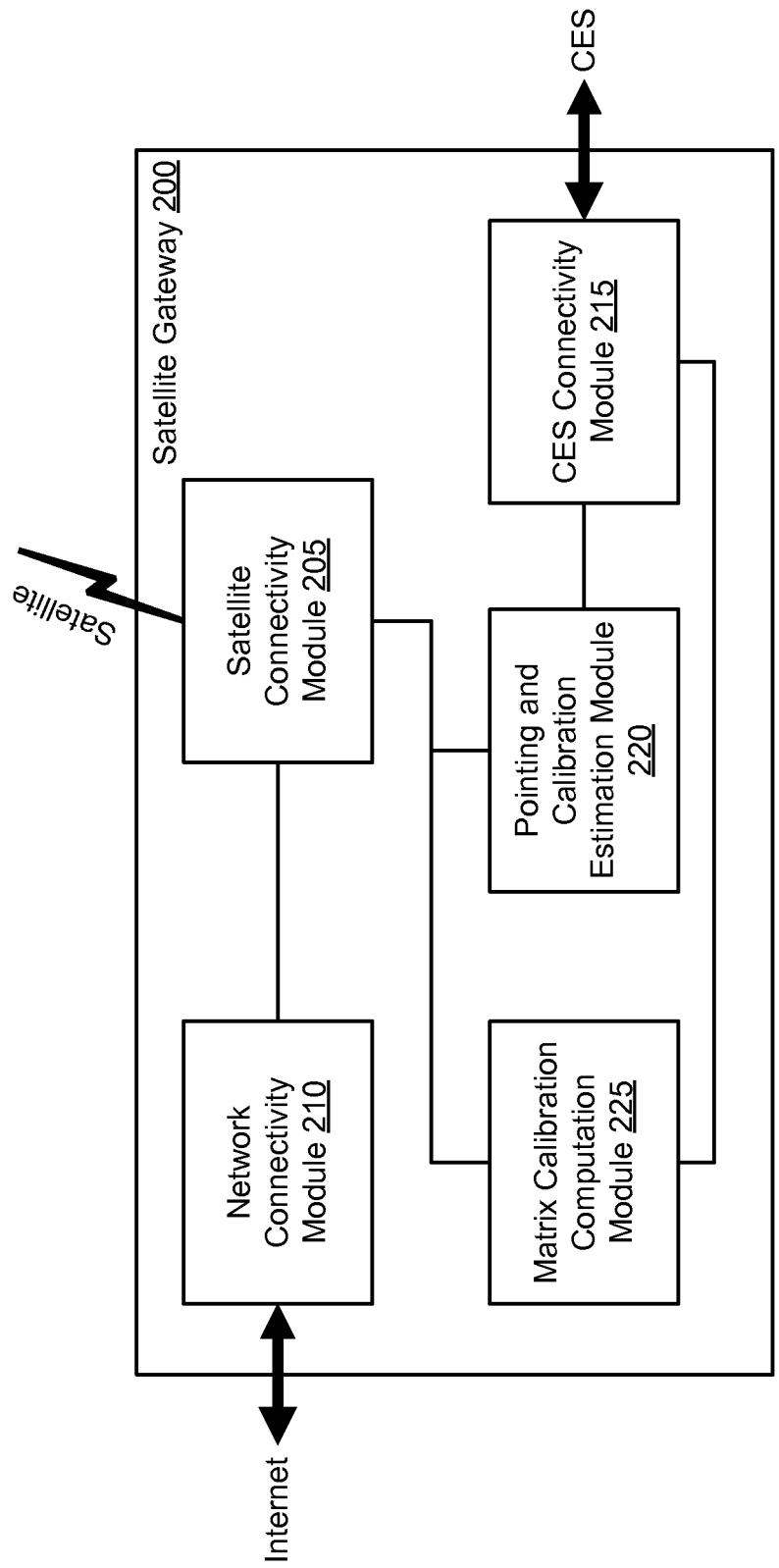
FIG. 2 illustrates an example of a system that is implemented in a gateway of a GBBF satellite communications system for amplitude calibration, phase calibration and/or satellite pointing correction.

FIG. 2 illustrates an example of a system 200 that is implemented in a gateway of a GBBF satellite communications system for amplitude calibration, phase calibration, and pointing correction. The system 200 may be implemented, for example, in gateway 110. System 200 includes a satellite connectivity module 205 that is connected to a network connectivity module 210, a pointing and calibration estimation module 220 and a matrix calibration computation module 225. In an alternative implementation, the system 200 may include either the pointing and calibration estimation module 220 or the matrix calibration computation module 225, but not both. The pointing and calibration estimation module 220 and/or the matrix calibration computation module 225 are connected to a CES connectivity module 215.

The satellite connectivity module 205 transmits signals to and receives signals from a satellite, for example satellite 105. The satellite connectivity module 205 may include physical hardware components such as signal amplifiers, modulators, demodulators, LNB (low noise blocker) and antennas, apart from other components. The satellite connectivity module 205 utilizes the various components to communicate with the satellite 105 over a feeder link, which may, for example, be the feeder link 145.

The satellite connectivity module 205 is configured to communicate data to and from user terminals (e.g., user terminals 120a-120f) via the satellite. The satellite connectivity module 205 also may be configured to communicate calibration signals to and from one or more CESs (e.g., CES 115a or CES 115b).

For example, for the return link calibration, each CES 115a and 115b may communicate a signal that includes a unique codeword (i.e., uplink a unique codeword) to the satellite 105. That is, each CES may be assigned a unique codeword that may then be uplinked by the respective CES during the return link calibration. The unique codeword transmitted by each of CES 115a and 115b may be received by some or all of the return link elements in the satellite 105. As stated previously, each return link element may have its own unique channel for communicating with the satellite gateway 110. The return link elements may retransmit the unique codeword signals received from the CESs 115a and 115b to the gateway 110 over the feeder link 145. A unique codeword may be, for example, a string of binary digits arranged in a predetermined sequence, such as a PN sequence or another easily identifiable sequence. The satellite connectivity module 205 in gateway 110 may receive the unique codeword signals from each CES via the return link elements and may measure the gain and/or phase of the received signals. The measured gain and/or phase of the signals may then be sent by the satellite connectivity module 205 to the pointing and calibration estimation module 220 and/or the matrix calibration computation module 225 for gain calibration, phase calibration and/or pointing correction. For some of the return link elements, the signals that are bounced from any or all of the CESs 115a and 115b may have a weak signal strength that cannot be detected over the noise in the communications link. Such a weak signal may, for example, occur when the position of the CESs 115a and/or 115b in the element's radiation pattern results in a very small gain (e.g., a gain substantially equal to zero), thereby, resulting in the signal received via the return link element having a very small and negligible amplitude. Consequently, the signals received from such return link elements may not be detected over the noise and, therefore, may not be used by the pointing and calibration estimation module 220 and/or the matrix calibration computation module 225 when performing gain calibration, phase calibration, and/or pointing correction.

For the forward link calibration, the satellite connectivity module 205 in gateway 110 may transmit a unique codeword signal for each forward link element in the satellite. That is, each forward link element in the satellite may be assigned a unique codeword that may then be uplinked by the connectivity module 205 during the forward link calibration. The satellite connectivity module 205 may transmit the assigned codewords to their respective forward link elements using their respective channels on the feeder link 145a. Each forward link element may retransmit its received codeword signal to the CESs on the ground that are stationed within its beam coverage area, as defined by the unique radiation pattern belonging to the forward link element. The CESs that receive the unique codeword signals measure the gain and/or phase of the codeword signals and send the measured data to the satellite gateway 110 along back channels. For example, the elements in satellite 105 may transmit the unique codewords received from the satellite gateway 110 to the CESs 115a and 115b over the downlinks 150b and 155b. The CESs 115a and 115b may measure the gain and/or phase of the received codeword signal and may transmit the measurement data to the satellite gateway 110 using the communications link 140.

The network connectivity module 210 connects the system 200 to one or more terrestrial networks, for example, the Internet 135. The network connectivity module 210 includes one or more physical components for the terrestrial connectivity over physical channels, for example, link 140. The combination of the satellite connectivity module 205 and the network connectivity module 210 connect the user terminals through the satellite gateway to one or more public and non-public networks including the Internet 135.

The CES connectivity module 215 receives calibration signals from CESs on the field (where field refers to the satellite coverage area) and sends the received signals to the pointing and calibration estimation module 220 for gain calibration and pointing correction. The CES connectivity module 215 also may send the received signals to a matrix calibration computation module 225 for gain and/or phase calibration. The CES connectivity module 215 includes one or more physical components for terrestrial connectivity to the CESs over physical channels. For example, the CES connectivity module 215 in satellite gateway 110 may receive gain and/or phase measurement data from the CESs 115a and 115b over the communications link 140. The gain and/or phase measurement data may be associated with the unique codewords used for forward link calibration and may retransmit the gain and/or phase measured for the corresponding codeword signals. For example, the received measurement data may be the measurement data for the unique codeword signals that were originally transmitted by the satellite connectivity module 205 in gateway 110 to the CESs 115a and 115b via the satellite 105 over the feeder link 145a.

The pointing and calibration estimation module 220 performs gain calibration and pointing correction. The pointing and calibration estimation module 220 includes one or more hardware and software components for receiving gain and/or phase measurement data for calibration signals and for performing gain calibration and pointing correction based on the received measurement data. For example, the pointing and calibration estimation module 220 in satellite gateway 110 may receive from the satellite connectivity module 205 the measured relative gain of return link satellite elements for return link calibration. The pointing and calibration estimation module 220 in satellite gateway 110 also may receive from the CES connectivity module 215 the measured relative gain of forward link satellite elements for forward link calibration. The pointing and calibration estimation module 220 may use a MMSE algorithm on the received measurement data to perform forward link and return link calibrations for GBBF to thereby optimize the formed beams corresponding to the formed beam coverage areas 130a and 130b. Once the pointing and calibration data has been estimated, the GBBF can use this information to adjust the beam forming amplitudes and phases to form a beam that compensates for any calibration and pointing errors on the spacecraft. For pointing errors, this involves forming a beam that is centered over a new location in the spacecraft's field of view. This new location may be selected to maximize the signal at a specific place on the earth, which is now in a different position due to the residual pointing error. For calibration information, the beam forming weights are adjusted to ensure that the shape of the beam remains as originally designed despite changes in the spacecraft antenna performance.

The pointing and calibration estimation module 220 also may use a MMSE algorithm on the received data to perform pointing correction. The pointing and calibration estimation module 220 may use weights with the algorithms for the gain estimation and/or pointing correction, where a weight indicates a certain degree of confidence in the measurement data corresponding to a single element (e.g., element i) with respect to a single CES (e.g., element j). In an alternative implementation, the pointing and calibration estimation module 220 may use the algorithms for the gain estimation and/or pointing correction without any confidence weights.

The matrix calibration computation module 225 is used for gain and/or phase calibration. The matrix calibration computation module 225 may be used as an alternative to, or in conjunction with, the pointing and calibration estimation module 220. The matrix calibration computation module 225 includes one or more hardware and software components for receiving gain and/or phase measurement data and for performing the gain and/or phase calibration based on the received measurement data. For example, the matrix calibration computation module 225 in satellite gateway 110 receives from the satellite connectivity module 205 measurements performed by the satellite connectivity module 205 of the relative gain and/or phase of calibration signals received from the CESs 115a and 115b via the return link elements of the satellite 105. The matrix calibration computation module 225 may use these measurements for return link calibration. The matrix calibration computation module 225 in satellite gateway 110 also may receive from the CES connectivity module 215 measurements performed by the CESs 115a and 115b of relative gain and/or phase of signals received by the CESs 115a and 115b from the gateway 110 via the forward link elements of the satellite 105. The matrix calibration computation module 225 may use these measurements for forward link calibration.

Specifically, the matrix calibration computation module 225 may use a matrix-based algorithm on the received measurement data to perform forward link and return link gain and/or phase calibrations for GBBF and, thereby optimize the formed beams corresponding to the formed beam coverage areas 135a and 135b. The matrix calibration computation module 225 may use weights with the algorithm for the gain and/or phase calibration, where a weight indicates a certain degree of confidence in the measurement data obtained for a given element (e.g., element i) with respect to a given CES (e.g., CES j). In an alternative implementation, the matrix calibration computation module 225 may use the algorithm without any confidence weights.

Accordingly, various implementations of the system 200 are possible. For example, in some implementations, pointing correction is not performed by the system 200 and, therefore, the pointing and calibration module 220 is simply a calibration module. In other implementations, only pointing correction is performed by the system 200, and, therefore, in these implementations, the pointing and calibration module 220 is simply a pointing correction module, and the system 200 does not include a calibration matrix computation module 225. In some implementations, the system 200 performs pointing correction using the module 220 while performing gain and/or phase calibration using the matrix computation module 225. In some implementations, the system 200 performs gain calibration using the calibration module 220 and performs phase calibration using the matrix computation module 225. In these implementations, the system 200 may or may not perform pointing correction using the module 220.

Figure 3:
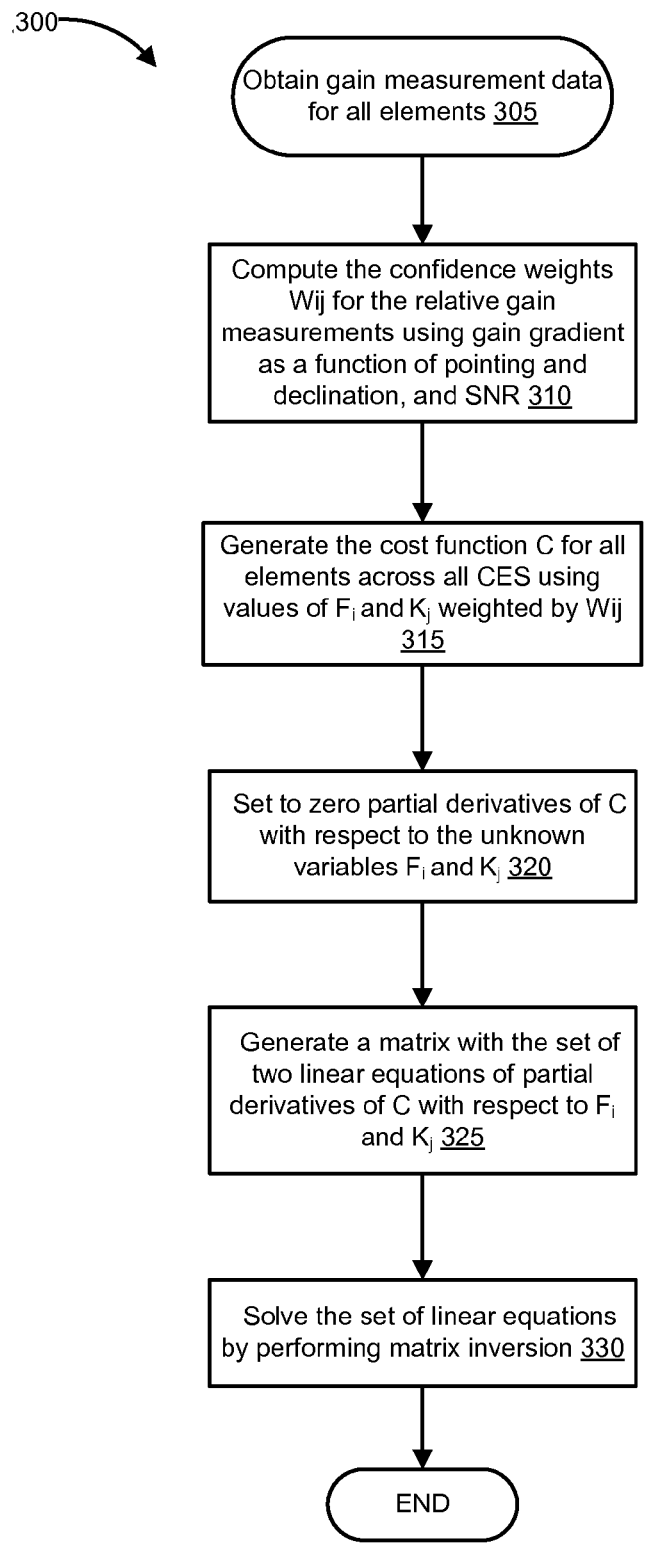
FIG. 3 is a flow chart illustrating an example of a process for implementing a weighted minimum mean square error (MMSE) algorithm for amplitude calibration for a GBBF system.

FIG. 3 is a flow chart illustrating an example of a process 300 for implementing a weighted minimum mean square error (MMSE) algorithm for amplitude calibration for a GBBF system. The following describes process 300 as being performed by components of the satellite communications system 100 that is described with reference to FIG. 1. However, the process 300 may be performed by other communications systems or system configurations.

The process 300 may be used for performing calibration correction based on the measurements of relative gain obtained from the CESs (for the forward links) or from the satellite (for the return links). The process 300 may be used, for example, to determine gain calibration values when the orientation of the satellite is known to a very high accuracy (i.e., when the pointing error is believed to be minimal or below a predetermined threshold) such that pointing correction is deemed unnecessary. Alternatively, given that the process 300 does not take into account the complexity of pointing correction, the process 300 also may be used, for example, when high processing speed is desired for producing the calibration values and/or when the processing capabilities of the device that performs process 300 are limited. The process 300 may produce results that are less accurate than a process that also takes into account pointing correction, such as, for example, the process 500 described below with respect to FIG. 5. The degree of inaccuracy may depend on the magnitude of the pointing error as reflected by the difference between the believed or assumed pointing orientation (as reflected by yaw, pitch and roll angles) and declination of the satellite and the actual pointing orientation and declination of the satellite.

The process 300 may be implemented, for example, in the satellite gateway 110 and specifically in the pointing and calibration estimation module 220 of the satellite gateway 110. The process 300 may be utilized for performing calibration correction on the return link and the forward link.

For the return link, each CES transmits a unique codeword signal to the satellite 105. As stated previously, for the return link calibration, the CESs each transmit a unique codeword to the satellite 105. The unique codeword transmitted by each CES is uniquely assigned to the CES and, therefore, may be used to identify the CES. The unique codeword signal is received by some or all of the return link elements on the satellite 105. The return link elements retransmit the received signals to the satellite gateway 110 using their respective unique channels over the feeder link 145b. The satellite gateway 110 may then obtain, using the satellite connectivity module 205, the return link calibration measurement data by measuring the gain of the codeword signals received from the antenna elements (305), which correspond to the signals generated by the CESs 115a and 115b. The collected measurements are passed to the pointing and calibration estimation module 220 and are used to perform the weighted MMSE algorithm implemented by the process 300. Notably, each gain measurement collected by the satellite gateway 110 during the return link calibration may be associated with a single CES through identification of the codeword in the signal that was measured and may be further associated with a single return link element on the satellite 105 through identification of the communication channel used to transmit the signal that was measured from the satellite 105 to the gateway 110.

The process 300 also may be utilized for performing calibration correction on the forward link. For the forward link, the satellite gateway 110 may generate unique codewords for each forward link element in the satellite 105 and may transmit signals that include the codewords to the forward link elements using the respective unique channels assigned to the different forward link elements. The forward link elements may re-transmit the codeword signals to the CESs using the service links. For a given forward link element, the unique codeword signal that is retransmitted by the element may be received by some or all of the CESs that are in its beam coverage area, as defined by its unique radiation pattern. The CESs may measure the gain on the received codeword signals and may then return the measurement data corresponding to the unique codewords to the satellite gateway 110 using the link 140 that connects the CESs to the satellite 105 on the backend. Notably, each gain measurement collected by the satellite gateway 110 during the forward link calibration may be associated with a single CES through identification of the CES that communicated the measurement data to the satellite gateway 110 over link 140 and may be further associated with a single forward link element on the satellite 105 through identification of the codeword in the signal that was measured.

For example, the satellite gateway 110 may transmit to the satellite 105, using the satellite connectivity module 205 and through the feeder link 145a, unique codeword signals for the forward link elements. The forward link elements in satellite 105 may receive and retransmit the codeword signals to the CESs 115a and 115b using the service downlinks 150a and 155a. The CESs 115a and 115b may receive the retransmitted signals and may measure the gain of the received codeword signals. The CESs 115a and 115b may then transmit the gain measurement data to the satellite gateway 110 using the link 140. The gain measurement data for all the elements may thereby be collected by the CES connectivity module 215 of the satellite gateway 110 (305), which may then send the collected data to the pointing and calibration estimation module 220. The pointing and calibration estimate module 220 may then use measurement data to perform the weighted MMSE algorithm implemented by the process 300.

The pointing and calibration estimation module 220 in the satellite gateway 110 computes confidence weights for the received calibration measurement data (310). For the return link, a confidence weight $W_{IJ}$ is used as an indication of the reliability of the measurement performed by the gateway 110 of the gain of a signal that is generated by a CES j and received by the gateway 110 via a return link element i. For the forward link, a confidence weight $W_{IJ}$ is used as an indication of the reliability of the measurement performed by a CES j of the gain of a signal that is generated by the gateway 110 and received by the CES j via a forward link element i.

The pointing and calibration estimation module 220 may estimate the confidence weights $W_{IJ}$ in many different ways. In one implementation example, the module 220 estimates a confidence weight $W_{IJ}$ by taking into account the gain radiation pattern of the antenna element i.

Figure 4:
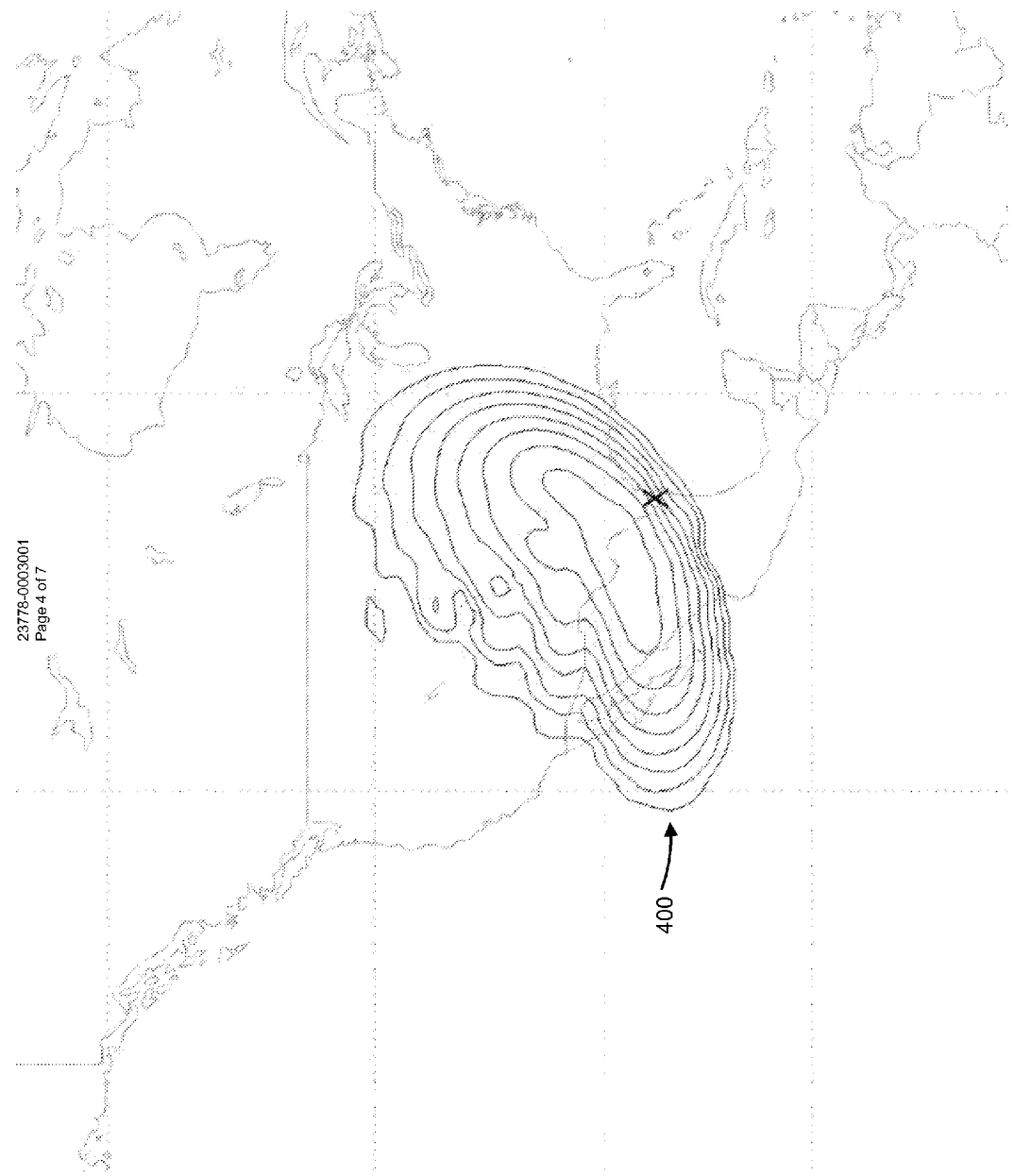
FIG. 4 shows an example of a gain radiation pattern of a return link antenna element of a satellite.

FIG. 4 shows an example 400 of a gain radiation pattern of a return link antenna element of a satellite. A gain radiation pattern of a return link antenna element, which also may be referred to as a geodetic gain radiation pattern or a topographic gain radiation pattern, is a gain distribution over a geography that can be used to estimate the gain of a signal that is received by the gateway 110 via the return link antenna element as a function of the geographic location of the transmitter on Earth that transmitted the signal. In FIG. 4, the gain radiation pattern 400 of the return link element is displayed as contours of constant gain on a map of North America. The contours represent the expected gain of signals received by the gateway 110 via the return link antenna element from transmitters at the corresponding locations in North America. FIG. 4 shows an "X" to designate the location of a particular CES (e.g., CES j) that has transmitted a signal to the return link antenna element (e.g., element i). The expected gain G of the transmitted signal may be determined from the gain radiation pattern 400 by looking up the gain G designated by the radiation pattern 400 as corresponding to the location (e.g., longitude and latitude) of the CES.

Forward link antenna elements also have gain radiation patterns. For forward link elements, the gain radiation pattern is a gain distribution over a geography that can be used to estimate the gain of a signal that is received by a receiver on Earth from the gateway 110 via the forward link element as a function of the geographic location of the receiver on Earth that received the signal. For example, the expected gain G of a signal received by a CES from the gateway 110 via a forward link element may be determined from the gain radiation pattern of the forward link element by looking up the gain G designated by the gain radiation pattern as corresponding to the location (longitude and latitude) of the CES.

Return link antenna elements and forward link antenna elements also may have phase radiation patterns. The phase radiation pattern of a return link antenna element is a phase distribution over a geography that can be used to estimate the phase of a signal that is received by the gateway 110 via the return link antenna element as a function of the geographic location of the transmitter on Earth that transmitted the signal. Similarly, the phase radiation pattern of a forward link antenna element is a phase distribution over a geography that can be used to estimate the phase of a signal that is received by a receiver on Earth from the gateway 110 via the forward link element as a function of the geographic location of the receiver on Earth that received the signal.

Notably, the radiation patterns (i.e., gain and phase radiation patterns) of antenna elements of a satellite change when the satellite orientation and/or declination changes. That is, the radiation patterns are a function of the satellite pointing direction or orientation as reflected, for example, by a pitch angle, a yaw angle, and a roll angle and also are a function of the satellite declination. In an alternative implementation, a radiation pattern may be a function of any one of the pitch angle, yaw angle or roll angle and/or the satellite declination, or it may be a function of any two of the pitch angle, yaw angle or roll angle and/or the satellite declination.

Referring back to FIG. 3, in one example, the module 220 may estimate a confidence weight $W_{ij}$ for a return link based on the signal-to-noise ratio (SNR) of the communications path from the CES j to the gateway 110 via the return link element i and based on a gradient with respect to longitude and latitude of a gain radiation pattern of the return link element i at the location of CES j. Similarly, the module 220 may estimate a confidence weight $W_{ij}$ for a forward link based on the SNR of the communications path from the gateway 110 to the CES j via the forward link element i and based on a gradient with respect to longitude and latitude of a gain radiation pattern of the forward link element i at the location of CES j.

In one example, the pointing and calibration estimation module 220 may compute the confidence weights for the gain measurements by using equation 1, as follows.

$$W_{ij} = 10^{-kGrad(r,p,y,d)} 10^{\frac{SNR-s_{min}}{10}} \text{ for } SNR < s_{min} \tag{1}$$

$$W_{ij} = 10^{-kGrad(r,p,y,d)} \text{ otherwise}$$

where:

$W_{ij}$=confidence weight for gain measurement corresponding to $i^{th}$ element and $j^{th}$ CES;

k is a configurable constant pre-determined at the satellite gateway 110;

$s_{min}$, is a minimum threshold value of the SNR for the communication path. $s_{min}$ may be a pre-determined value stored at or otherwise designated by the satellite gateway 110;

Grad(r, p, y, d) is the magnitude of the gradient of the geodetic radiation pattern of element i at the location of the $j^{th}$ CES as a function of the latitude and longitude of the $j^{th}$ CES; and SNR is the measured or calculated signal to noise ratio for the communication path.

As an alternative to the gain gradient, the pointing and calibration estimation module 220 may use parameters such as pattern gain, SNR of measurement and pointing errors to estimate the confidence weights $W_{ij}$, or any other parameter that indicates the reliability of the measurement. The selection of the parameter to be used in computing the confidence weights also may be influenced by the processing time required by the pointing and calibration estimation module 220.

Based on the computed confidence weights and the collected calibration measurements, the pointing and calibration estimation module 220 may generate a cost function C for all the elements across all the CESs (315). In one example, the cost function C corresponds to the following equation (i.e., equation 2):

$$C = \sum_{i}^{N} \sum_{j}^{B} W_{ij}(M_{ij} - F_i - G_{ij} - K_j)^2 \tag{2}$$

Where:
N=Number of elements
B=Number of CES
C=Cost function to be minimized
$W_{ij}$=Weights indicating the confidence of each measurement
$M_{ij}$=Measurement corresponding to $i^{th}$ element and $j^{th}$ CES (measurements are gain in decibels (dB))
$F_i$=Relative gain in dB of $i^{th}$ element $G_{ij}$=Expected element gain in dB for the $i^{th}$ element at the $j^{th}$ CES
$K_j$=Relative gain in dB of the CES measurements As described previously, the expected element gain $G_{ij}$ for a signal that is communicated via element i to or from CES j may be obtained from the gain radiation pattern of element i at the location of CES j. The gain radiation patterns, which also may be referred to as geodetic gain radiation patterns, may be generated for each element i based on the pointing direction and the declination of the satellite. As stated previously, for purposes of process 300, the pointing direction and the declination may be assumed to be known and, therefore, the corresponding gain radiation patterns for the different elements i may be determined using the known pointing direction and declination of the satellite.

The unknown variables in equation 2 are the relative element gains $F_i$ and the relative calibration gains $K_j$. Notably, for given gain values, it is possible to determine a solution $F_i$ and $K_j$ which minimize the cost function in equation 2. In order to determine the solution that minimizes the cost function in equation 2 and thus determine $F_i$ and $K_j$, the MMSE algorithm implemented by the process 300 in pointing and calibration estimation module 220 sets to zero the partial derivatives of the cost function C with respect to $F_i$ and $K_j$ (320), as illustrated, for example, in equations 3 and 4.

$$\frac{dC}{dF_i} = -2\sum_{j}^{B} W_{ij}(M_{ij} - F_i - G_{ij} - K_j) = 0 \tag{3}$$

$$\frac{dC}{dK_j} = -2\sum_{i}^{N} W_{ij}(M_{ij} - F_i - G_{ij} - K_j) = 0 \tag{4}$$

The MMSE algorithm implemented by the process 300 generates a matrix with the set of two linear equations 3 and 4 of partial derivatives of C with respect to $F_i$ and $K_j$ (325). The matrix is of the form $$DX=A \tag{5}$$

where:

$X_i=F_i$ for $i \leq N$ $X_i=K_{i-N}$ for $i \geq N$

The MMSE algorithm implemented by the process 300 solves the set of linear equations 3 and 4 as given by the matrix in equation 5 by performing matrix inversion (330), as exemplified by equations 6 and 7.

$$X=D^{-1}A \tag{6}$$

where D and A are taken from equations 3 and 4.

$$D_{ii} = \sum_{k}^{B} W_{ik} \text{ for } i \leq N \tag{7}$$

$D_{ij} = 0$ for $i \neq j$ and $j \leq N$ and $i \leq N$ $D_{ij} = W_{i(j-N)}$ for $i \leq N$ and $j > N$ $D_{ij} = W_{j(i-N)}$ for $i > N$ and $j \leq N$ $D_{ii} = \sum_{k}^{N} W_{k(j-N)}$ for $i > N$ $D_{ij} = 0$ for $i \neq j$ and $j > N$ and $i > N$ Therefore, the MMSE algorithm implemented by the process 300 may compute the relative gain of different element gains $F_i$ corresponding to a given CES and the relative power level $K_j$ among the CESs, using the weighted MMSE algorithm that is implemented by process 300. The computed values may be used by the satellite gateway 110 in the GBBF system for optimizing the beam forming.

The process 300 also may be used for phase calibration correction, if the satellite communications system 100 is equipped to detect delay. If the satellite gateway 110 can collect delay measurements from various components in the field, for example, the CESs 115a and 115b, then the equations 1 through 7 may be used for delay calibration correction, which is, in effect, equivalent to phase calibration correction. In this context, the relative delay may be, for example, a value that indicates a difference in time from a known reference time, or alternatively, the relative delay may be a difference in time between, for example, the times of signal reception from two CESs or the times of reception of two distinct signals from a CES.

Figure 5:
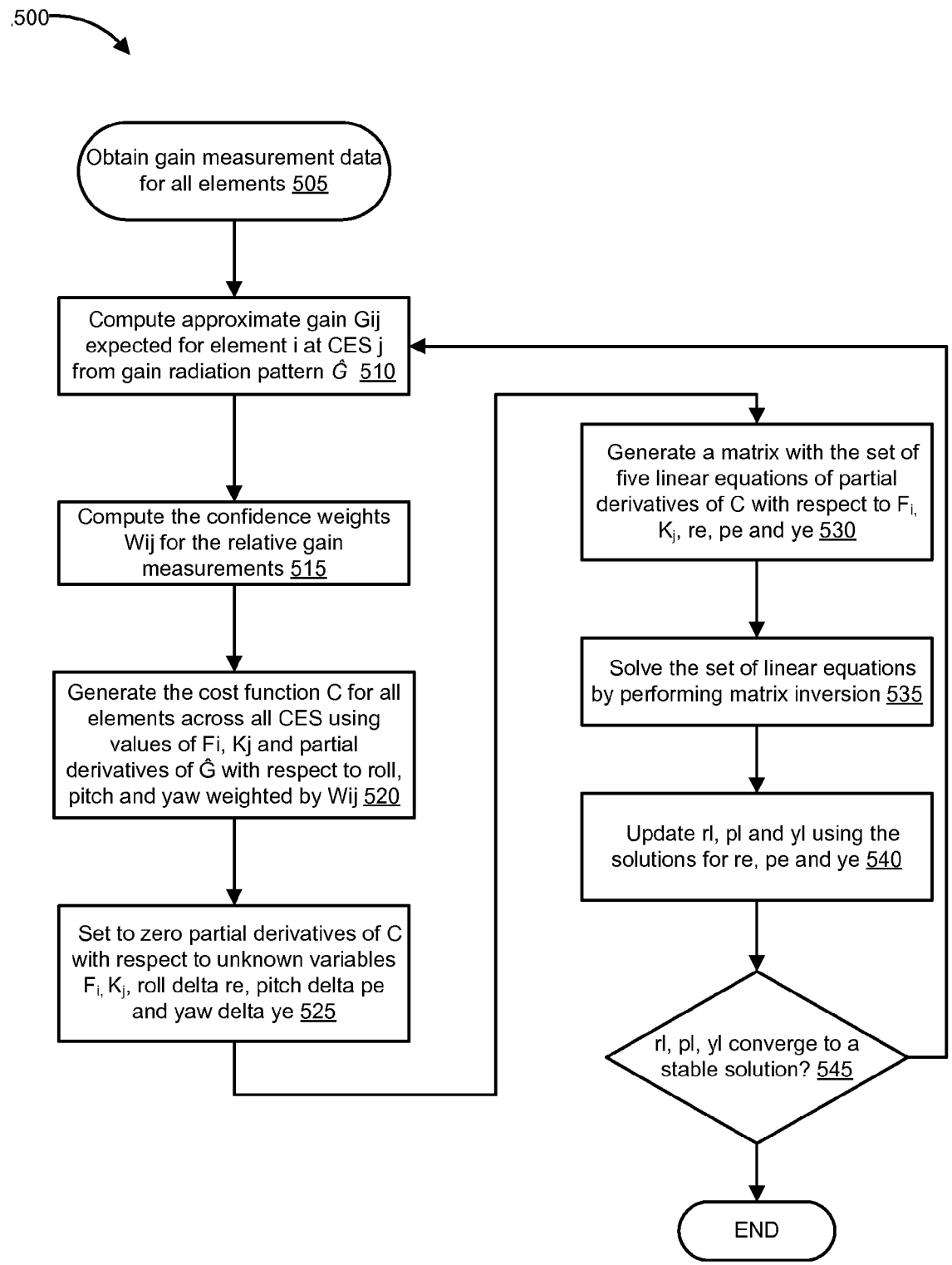
FIG. 5 is a flow chart illustrating an example of a process for implementing a weighted MMSE algorithm for amplitude calibration and satellite pointing correction for a GBBF system.

FIG. 5 is a flow chart illustrating an example of a process 500 for implementing a weighted MMSE algorithm for amplitude calibration and satellite pointing correction for a GBBF system. The following describes process 500 as being performed by components of satellite communications system 100 that is described with reference to FIG. 1. However, the process 500 may be performed by other communications systems or system configurations.

The process 500 may be used for performing amplitude calibration and pointing correction based on the collected gain measurement data and by adding terms for satellite roll, pitch and yaw. The process 500 may be used, for example, to determine gain calibration values when the orientation of the satellite is not known to a high accuracy such that pointing correction is necessary. Alternatively, given that the process 500 does consider the additional complexity of pointing correction, the process 500 also may be used, for example, when high processing speed is not a requirement for producing the calibration values and/or when the processing capabilities of the device that performs process 500 are substantial. The process 500 may produce results that are more accurate than a process that does not take into account pointing correction, such as, for example, the process 300 described previously with respect to FIG. 3. The degree of accuracy may depend on the magnitude of the pointing error correction as reflected by the difference between the believed or assumed pointing orientation (as reflected by yaw, pitch and roll angles) and declination of the satellite used in process 300 and the actual pointing orientation and declination of the satellite.

The process 500 may be implemented in satellite gateway 110 and specifically in the pointing and calibration estimation module 220 in satellite gateway 110. The satellite gateway 110 collects the measurements of relative gain of satellite feeds and the pointing data from the CESs on the field (505). For example, satellite gateway 110 may collect the return link measurement data using the satellite connectivity module 205, or the forward link measurement data from CESs 115a and 115b using the CES connectivity module 210. The collected measurement data are passed to the pointing and calibration estimation module 220 to be used by the process 500.

The MMSE algorithm implemented by the process 500 uses the gain radiation pattern $\hat{G}$ of each element to compute an approximate gain $G_{ij}$ expected at each CES j for each element i (510). As described previously, the expected element gain $G_{ij}$ for a signal that is communicated via element i to or from CES j may be obtained from the gain radiation pattern $\hat{G}$ of element i at the location of CES j. Notably, the gain radiation pattern $\hat{G}$ is a function of the satellite pointing direction and the declination. Thus, as the estimate of the satellite pointing direction is iteratively changed through performance of operation 540 described below, the gain radiation pattern $\hat{G}$ and, therefore, the corresponding gain $G_{ij}$ will change in each iteration until a stable pointing direction estimate is achieved.

The pointing and calibration estimation module 220 in the satellite gateway 110 may compute confidence weights for the received calibration measurement data (515). This operation may be performed in a manner analogous to that described previously with respect to operation 310 of process 300. Notably, when the confidence weights $W_{ij}$ are dependent on the radiation pattern (e.g., when the confidence weights are defined by equation 1 noted previously), the confidence weights will change as the estimate of the satellite pointing direction is iteratively changed through performance of operation 540 described below.

The pointing and calibration estimation module 220 may generate a cost function that takes into account the confidence weights Wij and partial derivatives of the radiation patterns $\hat{G}$ with respect to satellite roll, pitch and yaw angles (520). In one implementation example, the cost function is generated by making various assumptions with respect to how the radiation patterns $\hat{G}$ of the satellite elements i change with respect to changes in satellite roll, pitch and yaw angles. Specifically, the radiation patterns $\hat{G}$ are assumed to be approximately a flat plane with respect to roll, pitch and yaw angle in the vicinity of any given CES j. Accordingly, any change in the roll, pitch and yaw angle is assumed to cause only a linear change in the corresponding gain $G_{ij}$. These assumptions are expressed mathematically by equations 8-13:

$$\frac{dG}{dr} = \frac{d\hat{G}_{ij}}{dr} \tag{8}$$

$$\frac{dG}{dp} = \frac{d\hat{G}_{ij}}{dp} \tag{9}$$

$$\frac{dG}{dy} = \frac{d\hat{G}_{ij}}{dy} \tag{10}$$

$$\frac{d^2\hat{G}_{ij}}{dr_{ij}^2} = 0 \tag{11}$$

$$\frac{d^2\hat{G}_{ij}}{dp_{ij}^2} = 0 \tag{12}$$

$$\frac{d^2\hat{G}_{ij}}{dp_{ij}^2} = 0 \tag{13}$$

where:

r=Roll angle p=Pitch angle y=Yaw angle $\hat{G}_{ij}$=Approximation of gain for element i radiation pattern at CES j Given these assumptions, the MMSE algorithm implemented by process 500 in the pointing and calibration estimation module 220 may generate a cost function C, in a manner similar to equation 2, for all the elements across all the CESs using the collected measurements, the computed weights and the partial derivatives of $\hat{G}$ with respect to roll pitch and yaw (520), as illustrated by, for example, equation 14.

$$C = \sum_i^N \sum_j^B W_{ij}\left(M_{ij} - F_i - G_{ij} - K_j + re\frac{d\hat{G}_{ij}}{dr} + pe\frac{d\hat{G}_{ij}}{dp} + ye\frac{d\hat{G}_{ij}}{dy}\right)^2 \quad (14)$$

where:
rl=Last estimated roll error
pl=Last estimated pitch error
yl=Last estimated yaw error
re=Roll delta to be estimated relative to rl
pe=Pitch delta to be estimated relative to pl
ye=Yaw delta to be estimated relative to yl To optimize both the gain calibration and the pointing, the MMSE algorithm implemented by the process 500 in the pointing and calibration estimation module 220 obtains partial derivatives of the cost function C given by equation 14 and sets the resultant partial derivatives taken with respect to the unknown variables $F_i$, $K_j$, roll delta re, pitch delta pe and yaw delta ye to zero (525), as illustrated by, for example, by equations 15-19.

$$\frac{dC}{dF_i} = \sum_j^B -2W_{ij}\left(M_{ij} - F_i - G_{ij} - K_j + re\frac{d\hat{G}_{ij}}{dr} + pe\frac{d\hat{G}_{ij}}{dp} + ye\frac{d\hat{G}_{ij}}{dy}\right) = 0 \quad (15)$$

$$\frac{dC}{dK_j} = \sum_j^B -2W_{ij}\left(M_{ij} - F_i - G_{ij} - K_j + re\frac{d\hat{G}_{ij}}{dr} + pe\frac{d\hat{G}_{ij}}{dp} + ye\frac{d\hat{G}_{ij}}{dy}\right) = 0 \quad (16)$$

$$\frac{dC}{dre} = \sum_j^B -2W_{ij}\left(M_{ij} - F_i - G_{ij} - K_j + re\frac{d\hat{G}_{ij}}{dr} + pe\frac{d\hat{G}_{ij}}{dp} + ye\frac{d\hat{G}_{ij}}{dy}\right) = 0 \quad (17)$$

$$\frac{dC}{dpe} = \sum_j^B -2W_{ij}\left(M_{ij} - F_i - G_{ij} - K_j + re\frac{d\hat{G}_{ij}}{dr} + pe\frac{d\hat{G}_{ij}}{dp} + ye\frac{d\hat{G}_{ij}}{dy}\right) = 0 \quad (18)$$

$$\frac{dC}{dye} = \sum_j^B -2W_{ij}\left(M_{ij} - F_i - G_{ij} - K_j + re\frac{d\hat{G}_{ij}}{dr} + pe\frac{d\hat{G}_{ij}}{dp} + ye\frac{d\hat{G}_{ij}}{dy}\right) = 0 \quad (19)$$

In an alternative implementation, the partial derivative of the radiation patterns $\hat{G}$ may be computed with respect to any one of the satellite roll, pitch and yaw angles and therefore a cost function C for all the elements across all the CESs may be generated that includes only one derivative computed with respect to either the satellite roll or pitch or yaw, in addition to the collected measurements and the computed weights. Consequently, the partial derivative of C may be computed with respect to the delta to be estimate for either the satellite roll or pitch or yaw, in addition to the other unknown variables $F_i$ and $K_j$.

In yet another alternative implementation, the partial derivative of the radiation patterns $\hat{G}$ may be computed with respect to any two of the satellite roll, pitch and yaw angles and therefore a cost function C for all the elements across all the CESs may be generated that includes two derivatives computed with respect to any two of the satellite roll or pitch or yaw, in addition to the collected measurements and the computed weights. Consequently, the partial derivative of C may be computed with respect to the two deltas to be estimate for any two of the satellite roll or pitch or yaw, in addition to the other unknown variables $F_i$ and $K_j$.

The MMSE algorithm implemented by process 500 generates a matrix with the set of five linear equations 15-19 of partial derivatives of C with respect to $F_i$, $K_j$, re, pe and ye (530). The matrix is of the form=A, which is solved by the MMSE algorithm by performing matrix inversion (535) as illustrated, for example, by equation 20.

$$X = D^{-1}A \quad (20)$$

where:

$$X_i = F_i \text{ For } i \leq N \quad (21)$$

$$X_i = K_{i-N} \text{ For } i > Ni \leq B+N \quad (22)$$

$$X_i = re \text{ For } i = B+N+1 \quad (23)$$

$$X_i = pe \text{ For } i = B+N+2 \quad (24)$$

$$X_i = ye \text{ For } i = B+N+3 \quad (25)$$

Thus the values of the unknown variables $F_i$, $K_j$, roll delta re, pitch delta pe and yaw delta ye are determined by the MMSE algorithm implemented by the process 500. Once re, pe, and ye are calculated using equation 20, the MMSE algorithm updates the current values of rl, pl and yl (540), as shown in equations 26-28.

$$rl_{i+1} = rl_i + re \quad (26)$$

$$pl_{i+1} = pl_i + pe \quad (27)$$

$$yl_{i+1} = yl_i + ye \quad (28)$$

where i is the $i^{th}$ iteration of the MMSE algorithm implemented by process 500.

Subsequently, the MMSE algorithm checks whether the updated values of the roll, pitch and yaw estimate, as computed from equations 26-28, converge to a stable solution (545). The convergence may be satisfied, for example, by updating the pointing error based on the updated values of the roll, pitch and yaw estimate and checking to see if the difference between the updated value of the pointing error and the previous value of the pointing error is within a pre-determined threshold. If the difference is within the pre-determined threshold, then the MMSE algorithm determines that the updated values of the roll, pitch and yaw estimate converge to a stable solution. Then the algorithm terminates and the updated values of the gain calibration and the pointing error are sent by the pointing and calibration estimation module 220 to the GBBF system for adjusting the formed beams. In one implementation, the convergence to a stable solution may be checked by comparing the updated value of the pointing error based on the updated values of each of the roll, pitch and yaw estimates. In another implementation, the convergence to a stable solution may be checked by comparing the updated value of the pointing error based on the updated values of any of the roll, pitch and yaw estimates.

On the other hand, if the MMSE algorithm determines that the updated value of the pointing error based on the updated values of the roll, pitch and yaw estimate does not converge to a stable solution, then the process 500 returns to operation 510, thereby resulting in a new iteration in which the values of $G_{ij}$, $d\hat{G}_{ij}/dr$, $d\hat{G}_{ij}/dp$ and $d\hat{G}ij/dy$ are updated using new element radiation patterns that are determined from the new estimated satellite pointing orientation. The operations 510-545 are repeated until rl, pl and yl converge to a stable solution, as discussed above.

Figure 6:
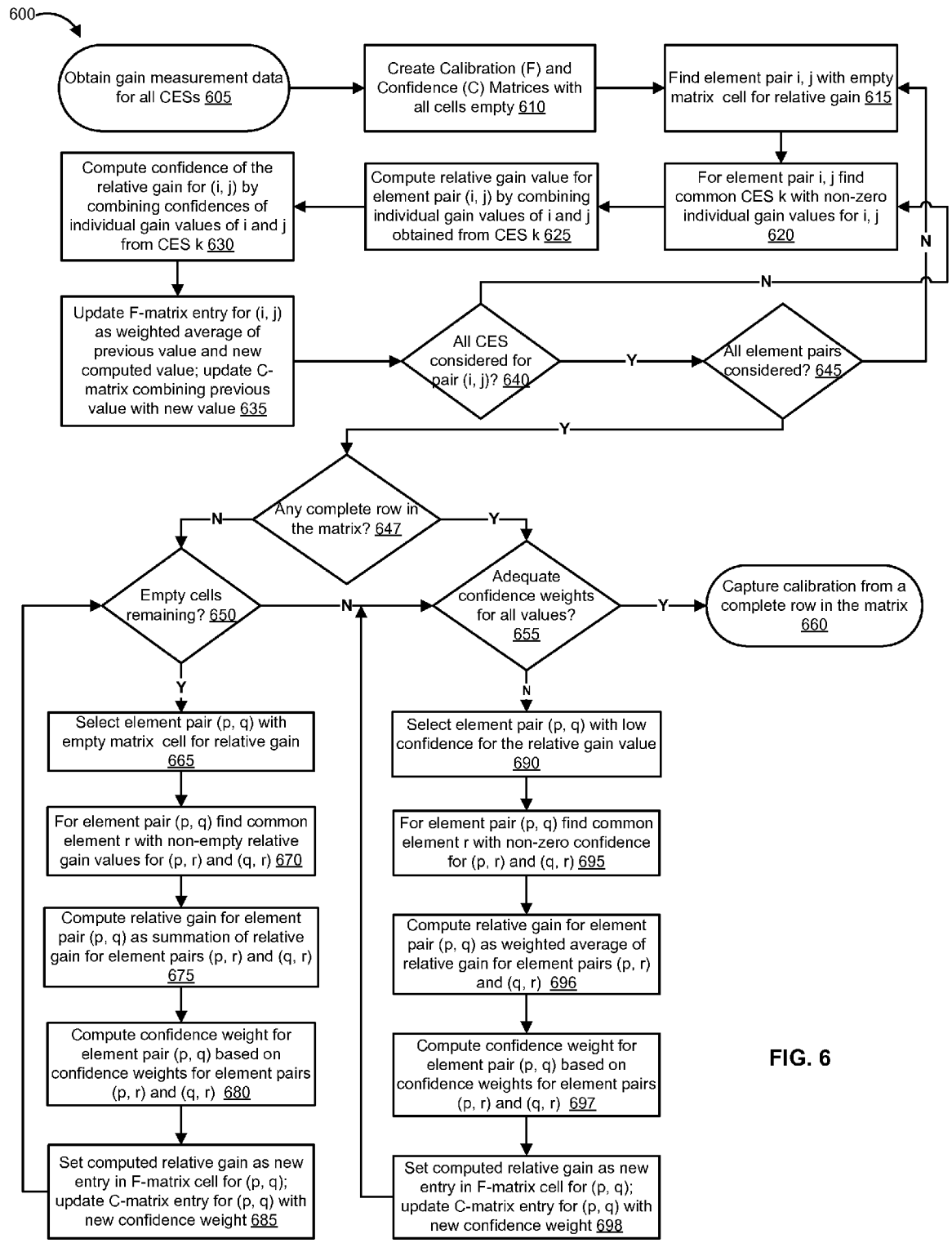
FIG. 6 is a flow chart illustrating an example of a process for implementing a weighted matrix calibration algorithm for amplitude calibration for a GBBF system.

FIG. 6 is a flow chart illustrating an example of a process 600 for implementing a weighted matrix calibration algorithm for amplitude calibration for a GBBF system. The process 600 may be implemented as an alternative to the processes 300 or 400, for example in case of satellite communications systems in which the gain measurements for all elements are not readily available from the collected CES data. The process 600 implements a matrix calibration algorithm which solves for the overall complex gain of each satellite element relative to one reference element. The matrix calibration algorithm performs this task by collecting gain measurements of the element radiation patterns corresponding to the CESs and constructing chains of relative gains passing through multiple elements and CESs, and storing a weighted average of all available chains. The following describes process 600 as being performed by components of satellite communications system 100 that is described with reference to FIG. 1. However, the process 600 may be performed by other communications systems or system configurations.

The process 600 may be implemented, for example, in the matrix calibration computation module 225 of the satellite gateway 110. The satellite gateway 110 collects the measurements of gain of the satellite elements for the CESs on the field (605). For example, as described with respect to the process 300, the satellite gateway 110 may collect the return link gain measurements corresponding to the signals generated by CESs 115a and 115b that are transmitted to the satellite gateway 110 by the return link elements on the satellite, using the satellite connectivity module 205. The satellite gateway 110 may collect from the CESs 115a and 115b, using the CES connectivity module 210, the forward link gain measurements of the codeword signals that are transmitted by the satellite gateway 110 to the satellite 105 and retransmitted to the CESs 115a and 115b using the forward link elements. The collected measurements are passed to the matrix calibration computation module 225 to be used by the matrix calibration algorithm implemented by the process 600.

Before the collected measurements can be used by the matrix calibration algorithm, the matrix calibration computation module 225, in an initial step, creates calibration (F) and confidence (C) matrices that have all cells empty initially (610), i.e., the cells do not have any information stored in them initially. In an alternative implementation, an empty cell may mean a cell containing a default value that is not meaningful for the computation of relative gain and/or relative phase.

The calibration matrix F is a square matrix having side lengths equal to the number of elements in the satellite communications system 100. Each cell of the F-matrix stores a calibration value between two elements and a weight signifying the confidence in that estimate. The confidence weights may be stored as a secondary entry in the F-matrix, or they may be stored separately in the confidence matrix C with a one-to-one mapping between the F-matrix and the C-matrix. For example, entry $F_{ij}$ in the F-matrix may store the calibration value between element pair (i, j), while entry $C_{ij}$ in the C-matrix may store the confidence weight of $F_{ij}$.

Once the F- and C-matrices are created, the matrix calibration algorithm implemented by the process 600 parses the F-matrix to find an element pair (i, j) for which the F-matrix cell is empty (615), i.e., the relative element gain in dB between element pair (i, j) is not measured. The matrix calibration algorithm finds a common CES k that has non-zero values for the collected individual gain measurements corresponding to elements i and j (620). In this context, the relative element gain in dB between element pair (i, j) may be indicative, for example, of the power that may be applied to a signal by element i compared to the power that may be applied to the same signal by element j. For example, in one implementation, a relative gain of 10 dB for element pair (i, j) would indicate that element i would apply 10 times as much power to a signal as would be applied by element j to the same signal.

If the matrix calibration algorithm is successful in identifying a CES k that has non-zero measurement values for elements i and j, then the matrix calibration algorithm computes the relative gain value for element pair (i, j) by combining the individual gain values for i and j obtained from the collected measurements corresponding to CES k (625), as illustrated, for example, by equation 29.

$$T_{ijk} = M_{ik} - G_{ik} - M_{jk} + G_{jk} \qquad (29)$$

where:

$T_{ijk}$=Relative element gain in dB between element pair (i, j) based on measurements $M_{ik}$ and $M_{jk}$ $M_{ik}$=Gain measurement from the $i^{th}$ element corresponding to the $k^{th}$ CES (gain measurements are in dB)

$G_{ik}$=Element gain in dB for the $i^{th}$ element corresponding to the $k^{th}$ CES, which may be determined from a gain radiation pattern of the $i^{th}$ element at the location (e.g., longitude and latitude) of the $k^{th}$ CES.

The matrix calibration algorithm also computes the weight indicating a confidence in the relative gain measurement for element pair (i, j) by combining the confidence weights of the individual gain values for i and j obtained from the collected measurements corresponding to CES k (630), as illustrated, for example, by equation 30.

$$C_{ijk} = \frac{1}{\frac{1}{W_{ik}} + \frac{1}{W_{jk}}} \qquad (30)$$

where:

$C_{ijk}$=Weight indicating confidence of $F_{ij}$ for element pair (i, j) based on CES k $W_{ik}$=Weight indicating confidence in the gain measurement for the $i^{th}$ element corresponding to the $k^{th}$ CES The empty cell in the F-matrix corresponding to the element pair (i, j) may happen only in the initial time of creation of the F-matrix. Once the matrix calibration algorithm has identified a common CES k for the element pair (i, j) and computed the relative gain and confidence weight as illustrated, for example, by equations 29 and 30, the F- and C-matrix entries for element pair (i, j) will no longer be empty.

However, for a given element pair (i, j), the matrix calibration algorithm examines every CES in the satellite communications system 100 and identifies any additional common CES l which has non-zero values for the gain measurements for elements i and j. For any such identified CES l, the algorithm computes the relative element gain between element pair (i, j), and the weight indicating a confidence in the relative element gain, using the equations 29 and 30. Subsequently, the matrix calibration algorithm updates the F-matrix entry for the element pair (i, j) by combining the newly computed relative gain for the element pair (i, j) with the previous value that existed in the F-matrix entry for element pair (i,j), using a weighted average as illustrated, for example, in equation 31. Correspondingly, the matrix calibration algorithm will update the C-matrix entry for the element pair (i, j) by a summation of the newly computed weight for the element pair (i, j) with the previous value that existed in the C-matrix entry for element pair (i, j), as shown, for example, by equation 32 (635).

$$Fm(n+1)_{ij} = \frac{Fm(n)_{ij}Cm_{ij} + T_{ij_k}Cm_{ij_k}}{Cm_{ij} + Cm_{ij_k}} \quad (31)$$

where:

$Fm(n)_{ij}$=Relative element gain between element pair (i, j) at iteration n of the matrix calibration algorithm; this value is the same as $F(n)_{ij}$, the m in $Fm(n)_{ij}$ indicates that the measurement is related to the magnitude (amplitude or gain) calibration $Cm_{ij}$=Confidence in the measurement of $Fm(n)_{ij}$; this value is the same as $C_{ij}$, the m in $Cm_{ij}$ only indicates that the measurement is related to the magnitude (amplitude or gain) calibration $Cm_{ij_k}$=Weight indicating confidence in the relative gain measurement for element pair (i, j) corresponding to CES k; this value is the same as $C_{ij_k}$, the m in $Cm_{ij_k}$ only indicates that the measurement is related to the magnitude (amplitude or gain) calibration $$Cm_{ij}=C_{ij}=C_{ij}+C_{ij_k} \quad (32)$$

For the very first measurement (n=0) of the relative gain between element pair (i, j) when the F-matrix and the C-matrix entries corresponding to the pair (i, j) are empty, the computations using equations 31 and 32 will return $T_{ij_k}$ and $C_{ij_k}$, as shown, for example, by equations 33 and 34.

$$Fm(n+1)_{ij} = \frac{Fm(n)_{ij}Cm_{ij} + T_{ij_k}Cm_{ij_k}}{Cm_{ij} + Cm_{ij_k}} = \frac{0.0 + T_{ij_k}Cm_{ij_k}}{0 + Cm_{ij_k}} = T_{ij_k} \quad (33)$$

$$Cm_{ij}=C_{ij}=C_{ij}+C_{ij_k}=0+C_{ij_k}=C_{ij_k} \quad (34)$$

As described previously, after updating the F- and C-matrices entries for element pair (i, j) corresponding to measurements for CES k, the matrix calibration algorithm implemented by process 600 parses through the list of all CESs in the satellite communications system 100 to check whether all CESs have been considered for element pair (i, j) (640). If the matrix calibration algorithm identifies any CES with measurement values for element pair (i, j) that has not been considered for computing the relative gain for element pair (i, j), then the process 600 iterates as explained with reference to example equations 29-32 (625)-(635).

However, if all CES have been considered for element pair (i, j), then the matrix calibration algorithm checks whether all element pairs present in the F-matrix have been considered for the computation of the relative gain (645). If the matrix calibration algorithm identifies any element pair that has not been considered for computing the relative gain, i.e., the F-matrix cell corresponding to the identified element pair is empty, then the process 600 iterates as explained with reference to operations (620)-(640).

Notably, after all element pairs present in the F-matrix have been considered for the computation of the relative gain in accordance with operations (620)-(640), the F-matrix and the C-matrix may still have empty cells for element pairs for which measurements have not been collected for both elements in the pair with respect to a same CES. That is, if the element pair is a pairing of element x and element y, then the corresponding cell in the F-matrix and the C-matrix may be empty when, for forward calibration, no single CES has received calibration signals via both element x and element y for which respective gain measurements have been performed by the CES and when, for return calibration, no single CES has transmitted calibration signals via both element x and element y for which respective gain measurements have been performed by the gateway.

Once the gain measurements corresponding to all elements collected from all the CESs have been considered, the matrix calibration algorithm parses the F-matrix to check whether any complete row exists in the F-matrix (647), i.e., whether all the cells in a given row have been fully populated due to the computation of the relative gains for all element pairs in the selected row. If the check returns the result that all the cells in the selected row are populated, i.e., the relative gains for all element pairs in the row have been computed, then the matrix calibration algorithm parses the C-matrix to check whether the confidence weights corresponding to the relative gains are adequate (655), for example, whether the confidence weights are higher than a pre-determined threshold value. If the check returns that all the confidence weights are adequate, then the matrix calibration algorithm may terminate and the process 600 may capture the calibration from the complete row in the matrix (660).

In an alternative implementation, the matrix calibration algorithm may parse the F-matrix to check whether a combination of two or more rows provides a complete set of relative gains, where any individual row may contain empty cells. Such a check may be done, for example, when sufficient measurement data is not available to populate every cell in the matrix, or sufficient measurement data is not available to populate every cell in a given row in the matrix.

If a combination of two or more rows that provide a complete set of relative gains are identified by the matrix calibration algorithm, then the matrix calibration algorithm parses the C-matrix to check whether the confidence weights corresponding to the relative gains are adequate (655), for example, whether the confidence weights are higher than a pre-determined threshold value. If the check returns that all the confidence weights are adequate, then the matrix calibration algorithm may terminate and the process 600 may capture the calibration from the combination of two or more rows in the matrix. If two or more rows are combined then each row may be normalized by the average of all the rows. Then the rows are combined weighted by the reliability of each cell that is combined.

In another implementation, the matrix calibration algorithm may not parse the F-matrix to check whether any complete row exists in the F-matrix or whether a combination of two or more rows provides a complete set of relative gains, until all the cells in the F-matrix have been fully populated. This might be the case, for example, when there is sufficient measurement data available to allow computation of relative gains for all the feed pairs corresponding to all the cells in the F-matrix.

During the check for any completed row in the matrix (647), the matrix calibration algorithm may determine that no row in the F-matrix is fully populated. The matrix calibration then continues to populate the empty cells in F-matrix with computed relative gain values. All future updates of the F-matrix henceforth may be based exclusively on the last computed values in the F-matrix.

The matrix calibration algorithm parses the F-matrix to check whether any empty cells are remaining in the F-matrix (650). If the check returns the result that all the cells are non-empty, i.e., the relative gains for all element pairs in the F-matrix have been computed, then the matrix calibration algorithm parses the C-matrix to check whether the confidence weights corresponding to the relative gains are adequate (655), for example, whether the confidence weights are higher than a pre-determined threshold value. If the check returns that all the confidence weights are adequate, then the matrix calibration algorithm may terminate and the process 600 may capture the calibration from any complete row in the matrix (660). The calibration may be obtained either directly from a single row in the F-matrix or multiple rows may be combined. If multiple rows are combined then each row may be normalized by the average of all the rows. Then the rows are combined weighted by the reliability of each cell that is combined.

However, if during a check for remaining empty cells in the F-matrix (650), the matrix calibration algorithm may identify a element pair that has an empty cell, i.e., the relative gain value for the element pair was not computed directly based on the collected CES measurement data. Alternatively, during a check of the confidence weights in the C-matrix, the matrix calibration algorithm may identify an element pair that has an inadequate value for the confidence weight corresponding to the relative gain for the element pair. The matrix calibration algorithm selects the element pair (p, q) that has an empty cell for relative gain in the F-matrix (665).

For the selected element pair (p, q), the matrix calibration algorithm searches over all the element pair entries in the F-matrix and identifies a third element r that has non-empty relative gain values for the element pairs (p, r) and (q, r) (670). Based on the identified third element r, the matrix calibration algorithm computes a relative gain for the element pair (p, q) as a summation of the relative gains for the element pairs (p, r) and (q, r) (675), as illustrated by equation 35.

$$T_{pq} = F_{pr} + F_{qr} \quad (35)$$

where:
$T_{pq}$=Relative element gain between element pair (p, q) that is computed
$F_{pr}$=Relative element gain between element pair (p, r)

Corresponding to computing the relative gain for the element pair (p, q) based on the relative gains for the element pairs (p, r) and (q, r), the matrix calibration algorithm computes the confidence weight for the relative gain for element pair (p, q) based on the confidence weights for the element pairs (p, r) and (q, r) (680), as illustrated by equation 36.

$$Ct_{pq} = \frac{1}{\frac{1}{C_{pr}} + \frac{1}{C_{qr}}} \quad (36)$$

where:
$Ct_{pq}$=Weight indicating confidence in the computed relative gain value $T_{pq}$
$C_{pr}$=Weight indicating confidence in the relative gain value for element (p, r)

The matrix calibration algorithm sets the relative gain value for element (p, q) in the F-matrix with the computed value $T_{pq}$ and sets the corresponding confidence weight $Ct_{pq}$ in the C-matrix entry for element (p, q) (685). The matrix calibration algorithm then checks for additional elements that have empty cells in the F-matrix and (650), (665)-(685) iterates till there are no empty cells remaining in the F-matrix.

When all the cells in the F-matrix are non-empty, during a check of the confidence weights in the C-matrix (655), the matrix calibration algorithm may identify a element pair that has an inadequate value for the confidence weight corresponding to the relative gain for the element pair. The matrix calibration algorithm selects the element pair (p, q) that has a low weight in the C-matrix for the confidence in the relative gain value (690).

For the selected element pair (p, q), the matrix calibration algorithm searches over all the element pair entries in the F-matrix and identifies a third element r that has non-zero confidence weights for the relative gains corresponding to element pairs (p, r) and (q, r) (695). Based on the identified third element r, the matrix calibration algorithm updates the relative gain for the element pair (p, q) as a weighted average of the relative gains for the element pairs (p, r) and (q, r) (696), as illustrated by equation 37.

$$F_{pq} = \frac{F_{pr}C_{pr} + F_{qr}C_{qr}}{C_{pr} + C_{qr}} \quad (37)$$

where:
$F_{pq}$=Relative element gain between element pair p, q
$C_{pr}$=Weight indicating confidence in the measurement of $F_{pr}$ Corresponding to computing the relative gain for the element pair (p, q) based on the relative gains for the element pairs (p, r) and (q, r), the matrix calibration algorithm computes the confidence weight for the relative gain for element pair (p, q) based on the confidence weights for the element pairs (p, r) and (q, r) (697), in a manner similar to the one illustrated by equation 36.

The matrix calibration algorithm updates the relative gain value for element (p, q) in the F-matrix with the new value $F_{pq}$ and updates the corresponding confidence weight $C_{pq}$ in the C-matrix entry for element (p, q) (698). The matrix calibration algorithm then checks for additional element pairs that have inadequate confidence weights in the C-matrix and (655), (690)-(685) iterates till all the confidence weights in the C-matrix are above the pre-determined threshold value for the confidence weights.

Figure 7:
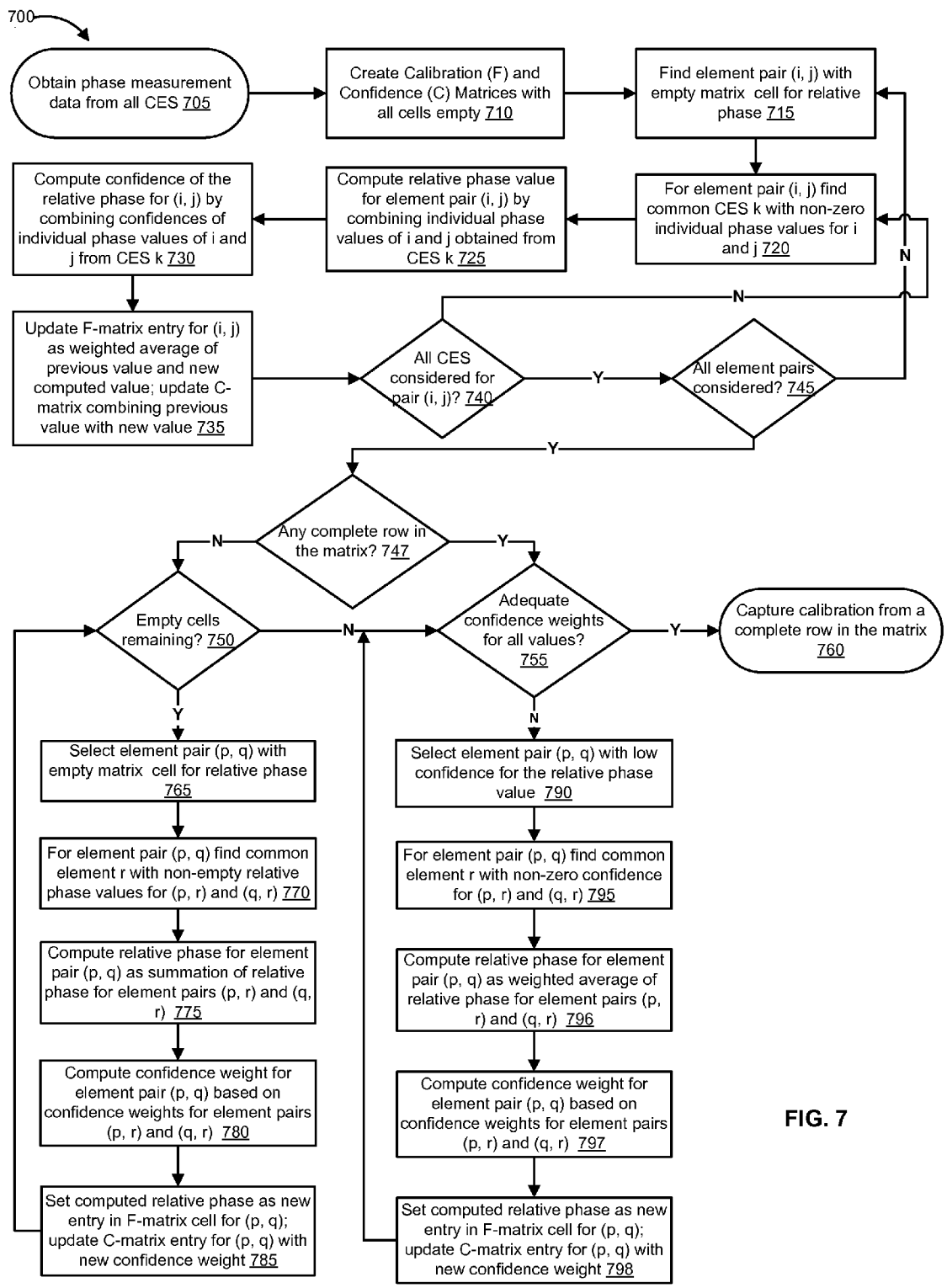
FIG. 7 is a flow chart illustrating an example of a process for implementing a weighted matrix calibration algorithm for phase calibration for a GBBF system.

FIG. 7 is a flow chart illustrating an example of a process 700 for implementing a weighted matrix calibration algorithm for phase calibration for a GBBF system. The process 700 may be implemented, for example, as a supplement to the gain calibration arrived at through processes 300, 400 and 600. Notably, process 700 provides phase calibration that may be used to supplement the gain calibration and thereby provide improved accuracy in the calibration values used for the beam forming. Process 700 assumes that phase measurements may be performed by the gateway and by the CESs and further assumes that phase radiation patterns for the elements may be computed and/or accessed to estimate expected phases.

The process 700 implements a matrix calibration algorithm which solves for the overall complex phase of each satellite element relative to one reference element. The following describes process 700 as being performed by components of satellite communications system 100 that is described with reference to FIG. 1. However, the process 700 may be performed by other communications systems or system configurations.

Similar to the process 600, the process 700 may be implemented in satellite gateway 110 and specifically in the matrix calibration computation module 225 in satellite gateway 110. The matrix calibration algorithm implemented by the process 700 is mostly similar to the matrix calibration algorithm implemented by the process 600. However the computation and/or update of the relative phase value between an element pair (i, j) based on the individual phase measurements for elements i and j obtained from a CES k (725, 735) are illustrated by equations 38 and 39, which are different from the initial computation and/or update of the relative gain in the process 600 (625, 635) as described by equations 29 and 31. As illustrated in equations 38 and 39, for the phase calibration for element pair (i, j), a modulo $2\pi$ is considered by the matrix calibration algorithm implemented by the process 700, in order to take into account the directional difference in phase.

$$Q = Pimod(T_{ij} - F\theta(n)_{ij}) + F\theta(n)_{ij} \quad (38)$$

$$F\theta(n+1)_{ij} = \frac{F\theta(n)_{ij} + QC\theta_{ij_k}}{C\theta_{ij} + C\theta_{ij_k}} \quad (39)$$

where:
$F\theta(n)_{ij}$=Relative element phase between element pair (i, j) at iteration n of the matrix calibration algorithm; this value is the same as $F(n)_{ij}$, the $\theta$ in $F\theta(n)_{ij}$ indicates that the measurement is related to the phase calibration $C\theta_{ij}$=Weight indicating confidence in the measurement of $F\theta(n)_{ij}$; this value is the same as C, the $\theta$ in $C\theta_{ij}$ only indicates that the measurement is related to the phase calibration $C\theta_{ij_k}$=Weight indicating confidence in the relative phase measurement for element pair (i, j) corresponding to CES k; this value is the same as $C_{ij_k, the\ \theta\ in\ C\theta_{ij_k}}$ only indicates that the measurement is related to the phase calibration Pimod=Returns the modulo $2\pi$ of the argument The matrix calibration algorithm for phase calibration that is implemented by the process 700 is otherwise similar to the matrix calibration algorithm for amplitude calibration that is implemented by the process 600. The two processes may be combined into one process that will implement one matrix calibration algorithm for computing both the relative gain and the relative phase corresponding to every element pair in the satellite communications system. However, the combined matrix calibration algorithm will use one set of equations for the initial computation and subsequent updates of the amplitude calibration (e.g., equations 29 and 31), and a separate set of equation for the initial computation and subsequent updates of the phase calibration (e.g., equations 38 and 39). Also the F-matrix and the C-matrix corresponding to the amplitude calibration may be different from the F-matrix and the C-matrix corresponding to the phase calibration. However, in an alternative implementation, the combined matrix calibration algorithm may use only one F-matrix to store the values for the relative gains and relative phases, where each cell corresponding to an element pair will have two entries, one for the relative gain and one for the relative phase. Correspondingly, the combined matrix calibration algorithm may use only one C-matrix for storing the weights indicating the confidence in the computed values of the relative gain and relative phase. Each cell in the C-matrix may have two entries, one entry for the weight indicating the confidence in the computed value of the relative gain, and the second entry for the weight indicating the confidence in the computed value of the relative phase.

The process 600 or the process 700 also may be used for delay calibration correction, if the satellite communications system 100 is equipped to detect delay. If the satellite gateway 110 can collect delay measurements from various components in the field, for example, the CESs 115a and 115b, then the equations 29 through 39 may be used for delay calibration. In this context, the relative delay may be, for example, a value that indicates a difference in time from a known reference time, or alternatively, the relative delay may be a difference in time between, for example, the times of signal reception from two CESs or the times of reception of two distinct signals from a CES.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for estimating calibration for ground based beam forming in a satellite communications network, the method comprising:

obtaining a measurement of gain of a first calibration signal retransmitted from one or more satellite elements, the first calibration signal being communicated by a first calibration station located at a first geographic location, the measurement of gain of the first calibration signal including a first measurement of gain for a first element of the one or more satellite elements retransmitting the first calibration signal;

accessing a first expected gain for the first element retransmitting the first calibration signal;

computing a first weight indicative of a confidence in the first measurement, at least in part, by calculating a gradient of a first geodetic radiation gain pattern of the first element;

obtaining a measurement of gain of a second calibration signal retransmitted by one or more satellite elements, the second calibration signal being communicated by a second calibration station located at a second geographic location that is different from the first geographic location, the measurement of gain of the second calibration signal including a second measurement of gain for a second element of the one or more satellite elements retransmitting the second calibration signal;

accessing a second expected gain for the one or more satellite elements retransmitting the second calibration signal;

computing a second weight indicative of a confidence in the second measurement, at least in part, by calculating a gradient of a first geodetic radiation gain pattern of the second element;

generating a cost function using at least the obtained measurement of gain for the one or more satellite elements retransmitting the first calibration signal, the obtained measurement of gain for the one or more satellite elements retransmitting the second calibration signal, the accessed first expected gain for the first element retransmitting the first calibration signal and the accessed second expected gain for the second element retransmitting the second calibration signal, the computed weights indicative of the confidences in the first and second measurements;

computing values for one or more unknown variables by reducing the cost function with respect to the one or more unknown variables, the one or more unknown variables including at least a satellite element relative gain or at least a calibration station relative gain; and storing the values.

2. The method of claim 1, wherein reducing the cost function with respect to the one or more unknown variables comprises minimizing the cost function with respect to the one or more unknown variables.

3. The method of claim 1, further comprising accessing the stored values and applying a beam forming algorithm that adjusts element signals using the values prior to combining the element signals to enable beam formation.

4. The method of claim 1,
wherein the satellite element relative gain variable comprises a variable that indicates gains of satellite elements relative to a gain of a reference satellite element or other known reference value, and
wherein the calibration station relative gain comprises a variable that indicates gains of calibration stations relative to a gain of a reference calibration station or other known reference value.

5. The method of claim 1, wherein the first geodetic radiation gain pattern comprises data indicating a distribution of gain over a geographic area for signals communicated by the first element of the satellite.

6. The method of claim 1, wherein computing the values includes:

computing a relative value indicating the gain of the first element relative to a gain of a reference element of the satellite, computing a relative value indicating a gain of the first calibration station relative to a gain of a reference calibration station or other known reference value, and computing a relative value indicating a gain of the second calibration station relative to the gain of the reference calibration station or other known reference value.

7. The method of claim 3, wherein the relative value indicating the gain of the first calibration station relative to the gain of the reference calibration station or other known reference value is different from the relative value indicating the gain of the second calibration station relative to the gain of the reference calibration station or other known reference value.

8. The method of claim 1, wherein computing the first weight further comprises:

calculating the gradient of the first geodetic radiation gain pattern of the first element with respect to a latitude and a longitude at the first geographic location;

calculating an SNR (signal to noise ratio) of the first calibration signal; and
using the SNR in addition to the gradient in the computation of the first weight if the value of the SNR is below a pre-determined threshold value.

9. The method of claim 1, wherein computing the first weight further comprises not using the SNR in addition to the gradient in the computation of the first weight if the value of the SNR is above the pre-determined threshold value.

10. The method of claim 1, wherein accessing the first expected gain for the first element further comprises:
accessing the first geodetic radiation gain pattern; and
identifying the first expected gain for the first element as a gain that is indicated by the first geodetic radiation gain pattern as corresponding to the first geographic location.

11. The method of claim 1, further comprising:
obtaining measurements of gain for one or more satellite elements retransmitting a third or more calibration signals communicated by one or more calibration stations located at a third or more geographic locations that are different from the first and the second geographic locations;
accessing expected gains for the one or more satellite elements retransmitting the third or more calibration signals; and
computing weights indicative of a confidence in the obtained measurements of gain for the one or more satellite elements retransmitting the third or more calibration signals,
wherein generating the cost function comprises generating the cost function using at least the obtained measurement of gain for the one or more satellite elements retransmitting the first calibration signal, the obtained measurement of gain for the one or more satellite elements retransmitting the second calibration signal, the obtained measurements of gain for the one or more satellite elements retransmitting the third or more calibration signals, the accessed first expected gain for the first element retransmitting the first calibration signal, the accessed expected second gain for second element retransmitting the second calibration signal, the accessed expected gains for the one or more satellite elements retransmitting the third or more calibration signals, the computed weights indicative of the confidences in the first and second measurements of gain, and the computed weights indicative of the confidences in the obtained measurements of gain for the one or more satellite elements retransmitting the third or more calibration signals.

12. A system for estimating calibration for ground based beam forming in a satellite communications network, the system comprising:
a processor;
one or more instructions encoded in a non-transitory computer-readable storage medium for execution by the processor, the one or more instructions when executed by the processor operable to:
obtain a measurement of gain of a first calibration signal retransmitted from one or more satellite elements, the first calibration signal being communicated by a first calibration station located at a first geographic location, the measurement of gain of the first calibration signal including a first measurement of gain for a first element of the one or more satellite elements retransmitting the first calibration signal;
access a first expected gain for the first element retransmitting the first calibration signal;
compute a first weight indicative of a confidence in the first measurement, at least in part, by calculating a gradient of a first geodetic radiation gain pattern of the first element;
obtain a measurement of gain of a second calibration signal retransmitted by one or more satellite elements, the second calibration signal being communicated by a second calibration station located at a second geographic location that is different from the first geographic location, the measurement of gain of the second calibration signal including a second measurement of gain for a second element of the one or more satellite elements retransmitting the second calibration signal;
access a second expected gain for the one or more satellite elements retransmitting the second calibration signal;
compute a second weight indicative of a confidence in the second measurement, at least in part, by calculating a gradient of a first geodetic radiation gain pattern of the second element;
generate a cost function using at least the obtained measurement of gain for the one or more satellite elements retransmitting the first calibration signal, the obtained measurement of gain for the one or more satellite elements retransmitting the second calibration signal, the accessed first expected gain for the first element retransmitting the first calibration signal and the accessed second expected gain for the second element retransmitting the second calibration signal, the computed weights indicative of the confidences in the first and second measurements;
compute values for one or more unknown variables by reducing the cost function with respect to the one or more unknown variables, the one or more unknown variables including at least a satellite element relative gain or at least a calibration station relative gain; and
store the values.

13. A method for estimating calibration for ground based beam forming in a satellite communications network, the method comprising:
obtaining, from multiple calibration stations, measurements of gain of a calibration signal that is retransmitted by a first element of one or more satellite elements and then received by the calibration stations, wherein the calibration stations include a first calibration station located at a first geographic location and a second calibration station located at a second geographic location that is different from the first geographic location, the measurements of gain including a first measurement of gain received from the first station and a second measurement of gain received from the second station;
accessing expected gains for the calibration signal retransmitted by the first element to the multiple calibration stations, wherein accessing the expected gains includes accessing a first expected gain for the calibration signal after being retransmitted by the first element and then received by the first calibration station and a second expected gain for the calibration signal after being retransmitted by the first element and then received by the second calibration station;
computing weights indicative of a confidence in the measurements of gain obtained from the multiple calibration stations, wherein computing the weights includes computing a first weight indicative of a confidence in the first measurement and a second weight indicative of a confidence in the second measurement, the first weight being computed, at least in part, by calculating a first gradient of a geodetic radiation gain pattern of the first element and the second weight being computed, at least in part, by calculating a second gradient of the geodetic radiation gain pattern of the first element;

generating a cost function using at least the measurements of gain obtained from the multiple calibration stations, the accessed expected gains for the calibration signal after being retransmitted by the first element to the multiple calibration stations, and the computed weights indicative of the confidence in the measurements of gain obtained from the multiple calibration stations;

computing values for one or more unknown variables by reducing the cost function with respect to the one or more unknown variables, the one or more unknown variables including at least a satellite element relative gain or at least a calibration station relative gain; and storing the values.

14. The method of claim 13, wherein reducing the cost function with respect to the one or more unknown variables comprises minimizing the cost function with respect to the one or more unknown variables.

15. The method of claim 13, further comprising accessing the stored values and applying a beam forming algorithm that adjusts element signals using the values prior to combining the element signals to enable beam formation.

16. The method of claim 13,
wherein the satellite element relative gain variable comprises a variable that indicates gains of satellite elements relative to a gain of a reference satellite element or other known reference value, and
wherein the calibration station relative gain comprises a variable that indicates gains of calibration stations relative to a gain of a reference calibration station or other known reference value.

17. The method of claim 13, wherein the first gradient of the geodetic radiation gain pattern comprises data indicating a gradient of a distribution of gain over a geographic area for the first element, the gradient being taken with respect to the first geographic location of the first station.

18. The method of claim 13, wherein computing the values includes computing a value for the satellite element relative gain of the first element and a value for the calibration station relative gain for the first station.

19. The method of claim 13, wherein computing the values includes computing a value for the calibration station relative gain for the first station and a value for the calibration station relative gain for the second station, the value computed for the first station being different from the value computed for the second station.

20. The method of claim 13, wherein computing the first weight further comprises:
calculating the first gradient of the geodetic radiation gain pattern of the first element with respect to a latitude and a longitude at the first geographic location;
calculating a first SNR (signal to noise ratio) of the calibration signal received by the first station; and
using the first SNR in the computation of the first weight if the value of the SNR is below a pre-determined threshold value.

21. The method of claim 20, wherein computing the second weight further comprises:
calculating the second gradient of the geodetic radiation gain pattern of the first element with respect to a latitude and a longitude at the second geographic location;
calculating a second SNR (signal to noise ratio) of the calibration signal received by the second station; and
using the second SNR in the computation of the second weight if the value of the second SNR is below the pre-determined threshold value.

22. The method of claim 13, wherein accessing the first expected gain for the calibration signal further comprises:
accessing the geodetic radiation gain pattern of the first element; and
identifying the first expected gain for the calibration signal as a gain that is indicated by the geodetic radiation gain pattern as corresponding to the first geographic location.

23. The method of claim 22, wherein accessing the second expected gain for the first element further comprises identifying the second expected gain for the first element as a gain that is indicated by the geodetic radiation gain pattern as corresponding to the second geographic location.

24. The method of claim 13, the method further comprising:
obtaining, from multiple calibration stations, measurements of gain of a second or more calibration signals that are retransmitted by a second or more elements of one or more satellite elements and then received by the calibration stations;
accessing expected gains for the second or more calibration signals retransmitted by the second or more elements to the multiple calibration stations;
computing weights indicative of a confidence in the measurements of gain obtained from the multiple calibration stations, wherein the weights are computed, at least in part, by calculating one or more gradients of geodetic radiation gain patterns of the one or more elements;
generating a cost function using at least the measurements of gain obtained from the multiple calibration stations, the accessed expected gains for the calibration signal after being retransmitted by the first element to the multiple calibration stations, the accessed expected gains for the second or more calibration signals after being retransmitted by the second or more elements to the multiple calibration stations and the computed weights indicative of the confidence in the measurements of gain obtained from the multiple calibration stations;
computing values for one or more unknown variables by reducing the cost function with respect to the one or more unknown variables, the one or more unknown variables including at least a satellite element relative gain or at least a calibration station relative gain; and
storing the values.

25. A system for estimating calibration for ground based beam forming in a satellite communications network, the system comprising:
a processor;
one or more instructions encoded in a non-transitory computer-readable storage medium for execution by the processor, the one or more instructions when executed by the processor operable to:
obtain, from multiple calibration stations, measurements of gain of a calibration signal that is retransmitted by a first element of one or more satellite elements and then received by the calibration stations, wherein the calibration stations include a first calibration station located at a first geographic location and a second calibration station located at a second geographic location that is different from the first geographic location, the measurements of gain including a first measurement of gain received from the first station and a second measurement of gain received from the second station;

access expected gains for the calibration signal retransmitted by the first element to the multiple calibration stations, wherein accessing the expected gains includes accessing a first expected gain for the calibration signal after being retransmitted by the first element and then received by the first calibration station and a second expected gain for the calibration signal after being retransmitted by the first element and then received by the second calibration station;

compute weights indicative of a confidence in the measurements of gain obtained from the multiple calibration stations, wherein computing the weights includes computing a first weight indicative of a confidence in the first measurement and a second weight indicative of a confidence in the second measurement, the first weight being computed, at least in part, by calculating a first gradient of a geodetic radiation gain pattern of the first element and the second weight being computed, at least in part, by calculating a second gradient of the geodetic radiation gain pattern of the first element;

generate a cost function using at least the measurements of gain obtained from the multiple calibration stations, the accessed expected gains for the calibration signal after being retransmitted by the first element to the multiple calibration stations, and the computed weights indicative of the confidence in the measurements of gain obtained from the multiple calibration stations;

compute values for one or more unknown variables by reducing the cost function with respect to the one or more unknown variables, the one or more unknown variables including at least a satellite element relative gain or at least a calibration station relative gain; and store the values.

26. A method for computing confidence weights for calibration earth station measurements in a satellite communications network, the method comprising:

identifying a calibration earth station located at a first geographic location;

identifying a satellite antenna element that is being calibrated through communications of one or more calibration signals between a gateway and the calibration earth station through the satellite antenna element;

accessing a geodetic radiation gain pattern for the satellite antenna element, the geodetic radiation gain pattern being a function of an orientation of a satellite that includes the satellite antenna element;

calculating a gradient of the geodetic radiation gain pattern;

computing a measurement confidence weight for one or more measurements of the one or more calibration signals using the calculated gradient; and applying the measurement confidence weight to the one or more measurements of the one or more calibration signals for calibrating the satellite antenna element.

27. The method of claim 24, wherein computing the measurement of confidence weight includes:

determining an SNR (signal to noise ratio) for the one or more calibration signals communicated between the gateway and the calibration earth station through the satellite antenna element;

comparing the determined SNR to a predetermined threshold; and based on whether the determined SNR is less than the predetermined threshold, computing the measurement confidence weight using the calculated gradient and the SNR.

28. The method of claim 25, further comprising, based on whether the determined SNR is equal to or more than the predetermined threshold, computing the measurement confidence weight for the element using the calculated gradient and not using the SNR.

29. The method of claim 24, wherein the geodetic radiation gain pattern comprises data indicating a distribution of gain over a geographic area for a signal communicated by the satellite antenna element, and wherein calculating the gradient comprises calculating the gradient based on data of the geodetic radiation gain pattern that corresponds to the first geographic location.

30. The method of claim 24, wherein calculating the gradient comprises calculating the gradient of the geodetic radiation pattern with respect to longitude and latitude at the point in the geodetic radiation pattern corresponding to the first geographic location.

31. A method for estimating delay calibration for ground based beam forming in a satellite communications network, the method comprising:

obtaining a measurement of delay of a first calibration signal retransmitted from one or more satellite elements, the first calibration signal being communicated by a first calibration station located at a first geographic location, the measurement of delay of the first calibration signal including a first measurement of delay for a first element of the one or more satellite elements retransmitting the first calibration signal;

accessing a first expected delay for the first element retransmitting the first calibration signal;

computing a first weight indicative of a confidence in the first measurement, at least in part, by calculating a gradient of a first geodetic radiation pattern of the first element;

obtaining a measurement of delay of a second calibration signal retransmitted by one or more satellite elements, the second calibration signal being communicated by a second calibration station located at a second geographic location that is different from the first geographic location, the measurement of delay of the second calibration signal including a second measurement of delay for a second element of the one or more satellite elements retransmitting the second calibration signal;

accessing a second expected delay for the one or more satellite elements retransmitting the second calibration signal;

computing a second weight indicative of a confidence in the second measurement, at least in part, by calculating a gradient of a first geodetic radiation pattern of the second element;

generating a cost function using at least the obtained measurement of delay for the one or more satellite elements retransmitting the first calibration signal, the obtained measurement of delay for the one or more satellite elements retransmitting the second calibration signal, the accessed first expected delay for the first element retransmitting the first calibration signal and the accessed second expected delay for the second element retransmitting the second calibration signal, the computed weights indicative of the confidences in the first and second measurements;

computing values for one or more unknown variables by reducing the cost function with respect to the one or more unknown variables, the one or more unknown variables including at least a satellite element relative delay or at least a calibration station relative gain; and storing the values.

32. A method for estimating delay calibration for ground based beam forming in a satellite communications network, the method comprising:

obtaining, from multiple calibration stations, measurements of delay of a calibration signal that is retransmitted by a first element of one or more satellite elements and then received by the calibration stations, wherein the calibration stations include a first calibration station located at a first geographic location and a second calibration station located at a second geographic location that is different from the first geographic location, the measurements of delay including a first measurement of delay received from the first station and a second measurement of delay received from the second station;

accessing expected gains for the calibration signal retransmitted by the first element to the multiple calibration stations, wherein accessing the expected gains includes accessing a first expected delay for the calibration signal after being retransmitted by the first element and then received by the first calibration station and a second expected delay for the calibration signal after being retransmitted by the first element and then received by the second calibration station;

computing weights indicative of a confidence in the measurements of delay obtained from the multiple calibration stations, wherein computing the weights includes computing a first weight indicative of a confidence in the first measurement and a second weight indicative of a confidence in the second measurement, the first weight being computed, at least in part, by calculating a first gradient of a geodetic radiation pattern of the first element and the second weight being computed, at least in part, by calculating a second gradient of the geodetic radiation pattern of the first element;

generating a cost function using at least the measurements of delay obtained from the multiple calibration stations, the accessed expected gains for the calibration signal after being retransmitted by the first element to the multiple calibration stations, and the computed weights indicative of the confidence in the measurements of delay obtained from the multiple calibration stations;

computing values for one or more unknown variables by reducing the cost function with respect to the one or more unknown variables, the one or more unknown variables including at least a satellite element relative delay or at least a calibration station relative gain; and storing the values.

* * * * *